United States Patent
Adachi et al.

(10) Patent No.: US 9,637,891 B2
(45) Date of Patent: May 2, 2017

(54) MANAGEMENT SERVER FOR WORKING MACHINE AND MANAGEMENT METHOD FOR WORKING MACHINE

(71) Applicant: Hitachi Construction Machinery Co., Ltd., Tokyo (JP)

(72) Inventors: Hiroyuki Adachi, Tsuchiura (JP); Kenji Ota, Tokyo (JP); Kouji Seki, Soka (JP); Kunio Seki, Yokohama (JP); Hiroshi Onose, Mito (JP); Satoshi Abe, Kawasaki (JP); Kazuki Kubota, Hitachinaka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/772,935

(22) PCT Filed: Mar. 7, 2014

(86) PCT No.: PCT/JP2014/056030
§ 371 (c)(1),
(2) Date: Sep. 4, 2015

(87) PCT Pub. No.: WO2014/136956
PCT Pub. Date: Sep. 12, 2014

(65) Prior Publication Data
US 2016/0017574 A1 Jan. 21, 2016

(30) Foreign Application Priority Data

Mar. 8, 2013 (JP) ................................. 2013-046916

(51) Int. Cl.
*G06F 17/00* (2006.01)
*E02F 9/20* (2006.01)
(Continued)

(52) U.S. Cl.
CPC ............ *E02F 9/267* (2013.01); *E02F 9/2054* (2013.01); *G05B 19/048* (2013.01); *G06Q 10/04* (2013.01);
(Continued)

(58) Field of Classification Search
CPC . G06F 17/00; G06F 19/00; E02F 9/20; G07C 5/00; G06Q 50/10; G06Q 50/08
(Continued)

(56) References Cited

U.S. PATENT DOCUMENTS 7,079,982 B2 * 7/2006 Ogura ..................... E02F 9/205
701/1
9,026,304 B2 * 5/2015 Olsen, III .............. G06Q 10/06
701/29.3

(Continued)

FOREIGN PATENT DOCUMENTS

EP 1 273 721 A1 1/2003
JP 2004-185190 A 7/2004

(Continued)

OTHER PUBLICATIONS

Written Opinion of the International Searching Authority received in corresponding International Application No. PCT/JP2014/056030 dated Jun. 3, 2014.

(Continued)

*Primary Examiner* — Tan Q Nguyen
(74) *Attorney, Agent, or Firm* — Mattingly & Malur, PC

(57) ABSTRACT

A management server for a working machine, including: a reception unit that receives a sensor output from a working machine; a regular report creation unit that creates, for each predetermined period of time, a regular report indicating an operation state of the working machine within the predetermined period of time based on the sensor output; an emergency report creation unit that creates at least one emergency (Continued)

report upon detecting abnormality data representing abnormality of the working machine based on the sensor output; an important report creation unit that creates an important report upon detecting predictive data indicating a sign of the abnormality based on the sensor output; and a delivery unit that delivers the regular report, the at least one emergency report, and the important report, respectively, to a regular report delivery target, an emergency report delivery target, and an important report delivery target.

9 Claims, 17 Drawing Sheets

(51) Int. Cl.
*E02F 9/26* (2006.01)
*G06Q 50/08* (2012.01)
*G06Q 10/04* (2012.01)
*G06Q 10/00* (2012.01)
*G05B 19/048* (2006.01)
*G07C 5/00* (2006.01)
*G07C 5/08* (2006.01)
*G07C 5/12* (2006.01)

(52) U.S. Cl.
CPC ............ *G06Q 10/20* (2013.01); *G06Q 50/08* (2013.01); *G07C 5/008* (2013.01); *G07C 5/085* (2013.01); *G07C 5/0808* (2013.01); *G07C 5/0841* (2013.01); *G07C 5/12* (2013.01); *G05B 2219/45012* (2013.01)

(58) Field of Classification Search
USPC .................. 701/31.4, 31.6, 31.8, 31.9, 32.1; 707/601, 602
See application file for complete search history.

(56) References Cited

U.S. PATENT DOCUMENTS

| | | | | |
|---|---|---|---|---|
| 2002/0123833 | A1* | 9/2002 | Sakurai | G07C 5/008 701/31.4 |
| 2006/0047630 | A1* | 3/2006 | Furuno | G06Q 10/0875 |
| 2006/0212203 | A1 | 9/2006 | Furuno | |
| 2013/0151170 | A1 | 6/2013 | Uchida | |
| 2014/0052328 | A1* | 2/2014 | Nguyen | G07C 5/0808 701/29.6 |

FOREIGN PATENT DOCUMENTS

| | | |
|---|---|---|
| JP | 2005-149310 A | 6/2005 |
| JP | 2007-186289 A | 7/2007 |
| JP | 4349477 A | 7/2009 |
| JP | 4756793 B2 | 6/2011 |
| JP | 2011-179215 A | 9/2011 |
| WO | 01/73220 A1 | 10/2001 |
| WO | 2012/042649 A1 | 4/2012 |

OTHER PUBLICATIONS

Yoshihiko Takishita, Application of ICT to Lifecycle Support for Construction Machinery, Hitachi Hyoron, May 1, 2012, p. 26-29, vol. 94, No. 5.
International Search Report of PCT/JP2014/056030.
Takishita, Y. et al., "Application of ICT to Lifecycle Support for Construction Machinery", Hitachi Review, 2013, pp. 107-112, vol. 62, No. 2, URL: http://www.hitachi.com/rev/pdf/2013/r2013_02_103.pdf.

* cited by examiner

FIG.7

| TIME AND DATE OF RECEPTION | WORKING MACHINE ID | DATA TYPE | DATA VALUE |
|---|---|---|---|
| YYYY/MM/DD hh:mm:ss | XXXXXX | HOUR METER | 2,685 |
| YYYY/MM/DD hh:mm:ss | XXXXXX | TIME ELAPSED AFTER PURCHASE | 131,400 |
| YYYY/MM/DD hh:mm:ss | XXXXXX | ENGINE START TIME | YYYY/MM/DD hh:mm:ss |
| ... | ... | ... | ... |
| YYYY/MM/DD hh:mm:ss | XXXXXX | ENGINE STOP TIME | YYYY/MM/DD hh:mm:ss |
| YYYY/MM/DD hh:mm:ss | XXXXXX | FUEL INJECTION QUANTITY | 160 |
| ... | ... | ... | ... |
| YYYY/MM/DD hh:mm:ss | XXXXXX | TUNING INFORMATION | ... |
| ... | ... | ... | ... |

FIG.8

| WORKING MACHINE ID | CUSTOMER INFORMATION | CONTRACTUAL COVERAGE | CONTRACT TERM | FIRST DELIVERY TARGET ADDRESS | FIRST LANGUAGE | SECOND DELIVERY TARGET ADDRESS | SECOND LANGUAGE |
|---|---|---|---|---|---|---|---|
| AAAAAA | ... | COMPREHENSIVE CONTRACT | YYYY/MM/DD~YYYY/MM/DD | XXX@example.co.jp | JAPANESE | ... | ... |
| BBBBBB | ... | TUNING CONTRACT DATA REPORT CONTRACT | YYYY/MM/DD~YYYY/MM/DD | XXX@example.co.jp | ENGLISH | ... | ... |
| CCCCCC | ... | MAINTENANCE CONTRACT | YYYY/MM/DD~YYYY/MM/DD | NONE | NONE | ... | ... |
| ... | ... | ... | ... | ... | ... | ... | ... |

FIG.13
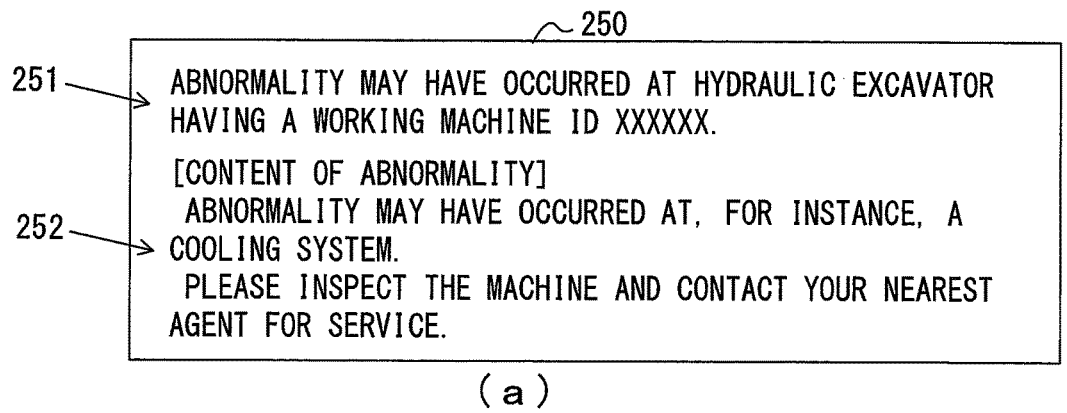
(a)
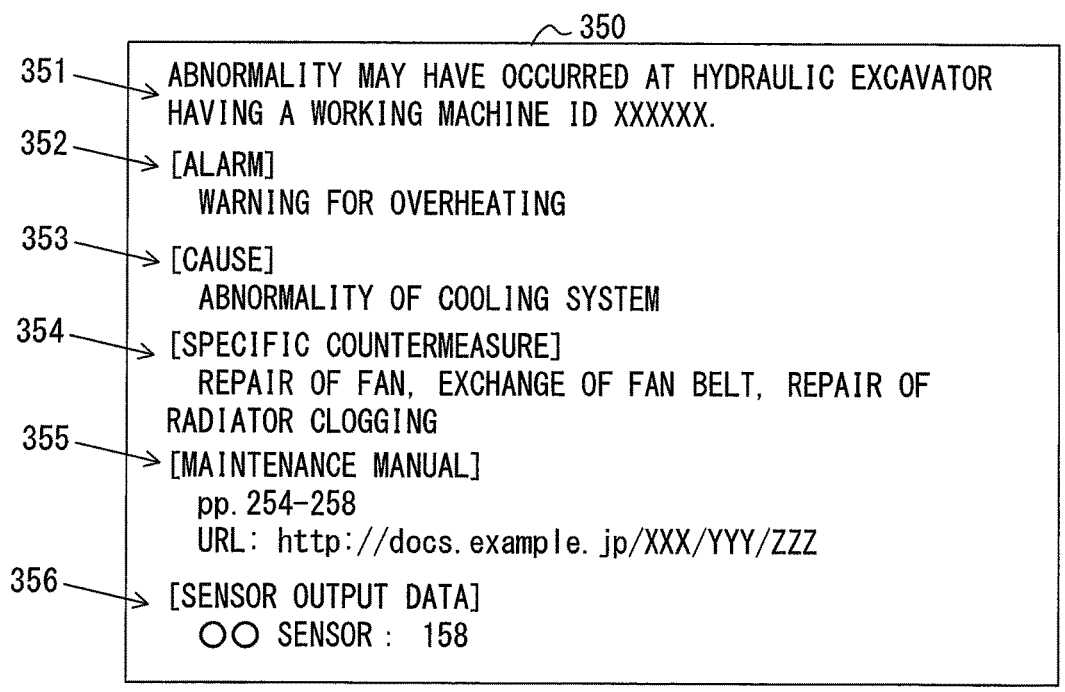
(b)

FIG.17

OPERATION STATE OF XXXXXX ON YEAR YYYY MONTH MM — 150

| | | |
|---|---|---|
| LATEST HOUR METER VALUE | 2,783 HOURS | 151 |
| ELAPSED YEARS | ONE YEAR AND 5 MONTHS | 152 |
| CUMULATIVE TOTAL NUMBER OF OPERATION DAYS | 24 DAYS | 153 |
| CUMULATIVE TOTAL OPERATION TIME | 172.1 HOURS | 154 |

OPERATION STATE CALENDAR — 155

| Sun | Mon | Tue | Wed | Thu | Fri | Sat |
|---|---|---|---|---|---|---|
| 1 | 2 | 3 | 4 | 5 | 6 | 7 |
| | 8.2 | 7.5 | 8.3 | 9.6 | 8.8 | 0.3 |
| | 150 | 130 | 161 | 187 | 173 | 2 |
| 8 | 9 | 10 | 11 | 12 | 13 | 14 |
| | 8.1 | 8.1 | 7.7 | 8.3 | 8.3 | 0.7 |
| | 132 | 147 | 160 | 156 | 150 | 4 |
| 15 | 16 | 17 | 18 | 19 | 20 | 21 |
| | | 7.8 | 8.1 | 7.8 | 7.7 | |
| | | 162 | 165 | 145 | 153 | |
| 22 | 23 | 24 | 25 | 26 | 27 | 28 |
| | 8.2 | 7.6 | 8.1 | 8.2 | 8.3 | 0.3 |
| | 170 | 161 | 169 | 159 | 165 | 1 |
| 29 | 30 | 31 | | | | |
| | 7.6 | 8.5 | | | | |
| | 171 | 151 | | | | |

Legend:
- ☐ 3.0 OR LESS HOURS
- ▒ 8.0 OR LESS HOURS
- ▓ 8.1 OR MORE HOURS
- 1 / 7.6 OPERATION TIME [HOUR]
- 114 FUEL CONSUMPTION [LITER]

| TUNING INFORMATION | EXECUTED ON YEAR YYYY MONTH MM DAY DD | | | — 156 |
|---|---|---|---|---|
| | P MODE | OUTPUT +8% | E MODE | OUTPUT -5% — 158 |

— 159  — 157  — 162

| FUEL CONSUMPTION | 3,324 LITERS | MONTH-TO-MONTH | +100 LITERS | 163 |
|---|---|---|---|---|
| AVERAGE FUEL CONSUMPTION | 19.3 LITERS/HOUR | MONTH-TO-MONTH | -0.3 LITERS/HOUR | 164 |
| CO2 DISCHARGE AMOUNT | 8,576kg | MONTH-TO-MONTH | +258kg | |

— 161  — 160

| | THIS HYDRAULIC EXCAVATOR | AVERAGE VALUE OF OTHER HYDRAULIC EXCAVATORS OF THE SAME MODEL AS THIS HYDRAULIC EXCAVATOR |
|---|---|---|
| FUEL CONSUMPTION | 3,324 LITERS | 1,852 LITERS |
| OPERATION FLUID TEMPERATURE | HIGH TEMPERATURE REGION | MEDIUM TEMPERATURE REGION |
| WATER TEMPERATURE | MEDIUM TEMPERATURE REGION | MEDIUM TEMPERATURE REGION |
| PUMP PRESSURE | HIGH PRESSURE REGION | MEDIUM PRESSURE REGION |

— 1610

MANAGEMENT SERVER FOR WORKING MACHINE AND MANAGEMENT METHOD FOR WORKING MACHINE

TECHNICAL FIELD

The present invention relates to a management server for a working machine and a management method for a working machine.

BACKGROUND ART

Conventionally, a management device is known that performs communication with a working machine and creates an operation report indicating details of the operation performed by the working machine at predetermined time intervals, e.g., a daily operation report (PTL 1).

CITATION LIST

Patent Literature

PTL 1: Japanese Patent No. 4349477

SUMMARY OF INVENTION

Technical Problem

The prior art has a problem that an administrator or a service person needs to directly operate a terminal upon transmission and receipt of information necessary for the management of the working machine.

Solution to Problem

According to the 1st aspect of the present invention, a management server for a working machine, comprises: a reception unit that receives a sensor output from the working machine; a regular report creation unit that creates, for each predetermined period of time, a regular report indicating an operation state of the working machine within the predetermined period of time based on the sensor output; an emergency report creation unit that creates at least one emergency report upon detecting abnormality data representing abnormality of the working machine based on the sensor output; an important report creation unit that creates an important report upon detecting predictive data indicating a sign of the abnormality based on the sensor output; and a delivery unit that delivers the regular report, the at least one emergency report, and the important report, respectively, to a regular report delivery target, an emergency report delivery target, and an important report delivery target.

According to the 2nd aspect of the present invention, in the management server for a working machine according to the 1st aspect, it is preferred that the management server further comprises a first data base that stores first information relating to a language, and a language determination unit that determines the language referring to the first information. The regular report creation unit, the emergency report creation unit, and the important report creation unit creates the regular report, the at least one emergency report, and the important report in the language determined by the language determination unit.

According to the 3rd aspect of the present invention, in the management server for a working machine according to the 2nd aspect, it is preferred that the management server further comprises a delivery target identification unit that identifies the regular report delivery target, the emergency report delivery target, and the important report delivery target. In the first database, second information relating to the regular report delivery target, the emergency report delivery target, and the important report delivery target is further stored. The delivery target identification unit refers to the second information to identify as the emergency report delivery target, a first delivery target that corresponds to a purchaser of the working machine and a second delivery target that corresponds to a seller of the working machine, as the important report delivery target, the second delivery target that corresponds to the seller, and as the regular report delivery target, the first delivery target that corresponds to the purchaser and the second delivery target that corresponds to the seller.

According to the 4th aspect of the present invention, in the management server for a working machine according to any one of the 1st through the 3rd aspects, it is preferred that the management server further comprises: a second database that stores third information relating to tuning executed to the working machine by an external terminal device; and a control unit that receives the third information from the external terminal device and stores the received third information at the second database. If the second database stores the third information when creating the regular report, the regular report creation unit creates the regular report including the third information.

According to the 5th aspect of the present invention, in the management server for a working machine according to any one of the 1st through the 4th aspects, it is preferred that the regular report creation unit additionally describes in the regular report an average value of any one of fuel consumption, operation fluid temperature, water temperature, and pump pressure based on sensor outputs from a plurality of other working machines of the same model as the working machine.

According to the 6th aspect of the present invention, in the management server for a working machine according to any one of the 1st through the 5th aspects, it is preferred that the emergency report creation unit switches a mode for detection of the abnormality data depending on a type of the sensor output to one selected from a mode in which the abnormality data is detected if the sensor output exceeds a predetermined threshold value once, a mode in which the abnormality data is detected if the sensor output exceeds the predetermined threshold value a plurality of times consecutively, or a mode in which the abnormality data is detected if the sensor output exceeds the predetermined threshold time a specified number of time within a fixed period of time, when detecting the abnormality data based on the sensor output.

According to the 7th aspect of the present invention, in the management server for a working machine according to the 3rd aspect, it is preferred that: the at least one emergency report includes a first emergency report and a second emergency report that contains an amount of information larger than the first information; and the delivery target identification unit identifies the first delivery target that corresponds to the purchaser as the emergency report delivery target that corresponds to the first emergency report, and the second delivery target that corresponds to the seller as the emergency report delivery target that corresponds to the second emergency report.

According to the 8th aspect of the present invention, in the management server for a working machine according to any one of the 1st through the 7th aspects, it is preferred that: at least one of the regular report creation unit, the emergency report creation unit, and the important report creation unit indicates, as an item of fuel consumption of the working machine to be described in at least one report selected from the regular report, the at least one emergency report, and the important report, in an item indicating region provided corresponding to a date indicating region in which a numerical value of each date within the predetermined period of time is indicated, the fuel consumption on the each date corresponding to the numerical value indicated in the date indicating region; and in the at least one report, the date indicating region and the item indicting region are arranged in numbers corresponding to a number of days within the predetermined period of time in a matrix form.

According to the 9th aspect of the present invention, a method for managing a working machine, comprises: receiving a sensor output from the working machine; creating, for each predetermined period of time, a regular report that indicates an operation state of the working machine within the predetermined period of time based on the sensor output; creating at least one emergency report each time when abnormality data representing abnormality of the working machine is detected based on the sensor output; creating an important report each time when predictive data indicating a sign of the abnormality is detected based on the sensor output; and delivering the regular report, the at least one emergency report, and the important report, respectively, to a regular report delivery target, an emergency report delivery target, and an important report delivery target, which are predetermined in advance.

According to the 10th aspect of the present invention, in the method for managing a working machine according to the 9th aspect, it is preferred that a mode for detection of the abnormality data is switched depending on a type of the sensor output to one selected from a mode in which the abnormality data is detected if the sensor output exceeds a predetermined threshold value once, a mode in which the abnormality data is detected if the sensor output exceeds the predetermined threshold value a plurality of times consecutively, and a mode in which the abnormality data is detected if the sensor output exceeds the predetermined threshold time a specified number of time within a fixed period of time, when detecting the abnormality data based on the sensor output.

Advantageous Effects of Invention

The present invention, which is configured to automatically deliver a report that contains necessary information, enables a purchaser or sales person of a hydraulic excavator to obtain necessary information without time-consuming operation.

BRIEF DESCRIPTION OF DRAWINGS

FIG. 7 is a diagram showing an example of data stored in a sensor information database.

FIG. 8 is a diagram showing an example of data stored in a contract information database.

FIG. 13 is a diagram showing an example of the format of an emergency report.

FIG. 16 is a diagram illustrating the manner of switching a detection method of detecting abnormality data by the control device depending on the result of distinguishing the data type of sensor output or the like.

FIG. 17 is a diagram showing an example of the format of a regular report.

DESCRIPTION OF EMBODIMENTS

In reference to the attached drawings, explanation is made on an embodiment of the present invention adopted in a server that constitutes a management system of a hydraulic excavator.

Figure 1:
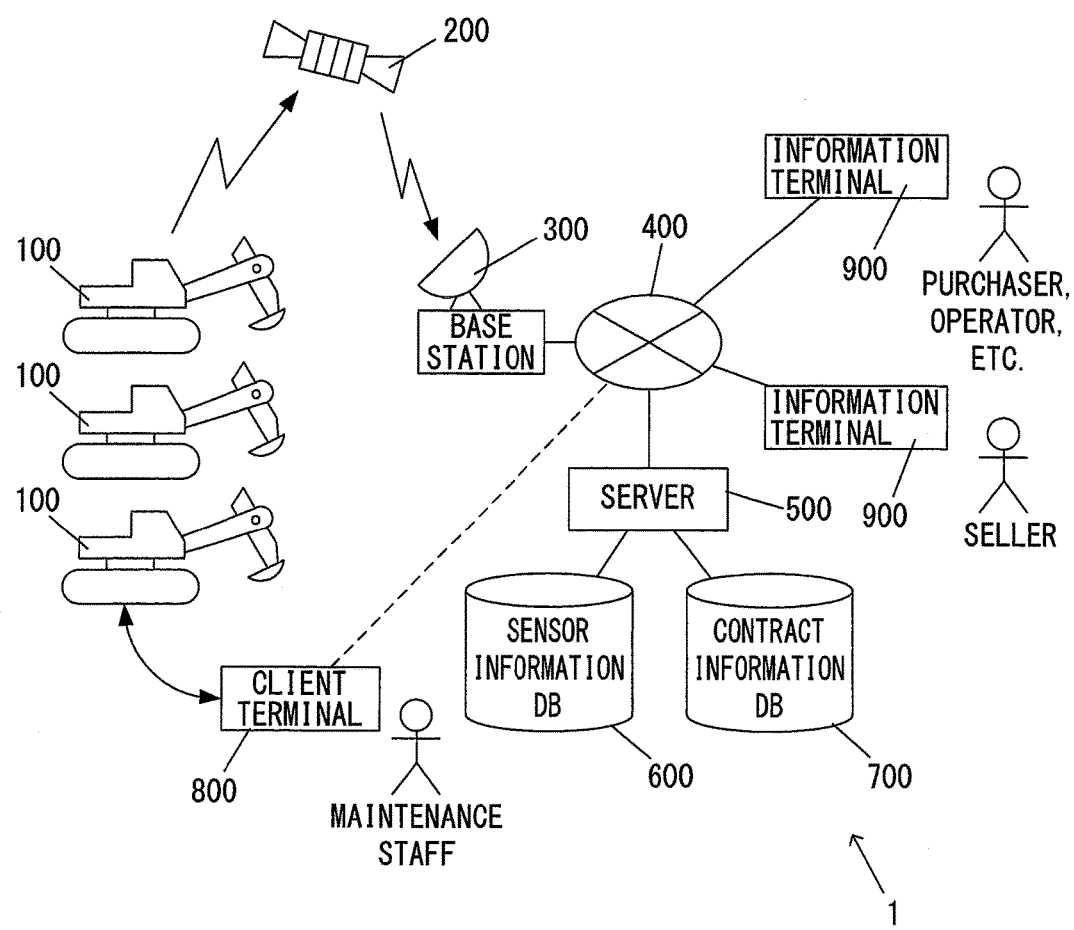
FIG. 1 is a diagram schematically illustrating an outline of a management system for a hydraulic excavator including a server according to an embodiment of the present invention.

FIG. 1 is a diagram illustrating an outline of a management system for a hydraulic excavator including a server according to an embodiment of the present invention. In FIG. 1, a management system 1 manages a plurality of hydraulic excavators. The management system 1 includes a server 500 according to this embodiment and a client terminal 800, which is a portable, mobile information terminal. The server 500 is connected to a network 400, which may be a public line network. To the network 400 are connected a base station 300 and a plurality of information terminals 900 as well as the server 500. The server 500 is capable of transmitting data to and receiving data from these nodes connected to the network 400, i.e., the base station 300 and the information terminals 900. The client terminal 800 is connectable to the network 400 through a wireless station or connection equipment not shown in the figure.

Each hydraulic excavator 100 has various types of sensors that detect various states of units of the hydraulic excavator 100 itself. Each hydraulic excavator 100 has a controller described later that transmits outputs of the various sensors to the base station 300 at predetermined timing via a transmitter described later. The predetermined timing is at a frequency of, for instance, once for several minutes to several hours. The timing of transmitting the sensor outputs may be at predetermined timing different from this. The timing of transmitting the sensor outputs may be different for different types of sensors or the same for all the sensors.

Upon receipt of the sensor outputs via a communication satellite 200, the base station 300 transmits the received sensor outputs to the server 500 via the network 400. To the server 500 are connected a sensor information database (DB) 600 and a contract information database 700. The server 500 has a control device described later, which adds information, for instance, information for identifying the hydraulic excavator 100 that transmitted the sensor outputs and the time and date of transmission of the sensor outputs, to the sensor outputs received from the hydraulic excavator 100 via the base station 300 before the control device can store the obtained information at the sensor information database 600. That is, the control device at the server 500 collects the sensor outputs from the hydraulic excavators 100 and stores the collected sensor outputs at the sensor information database 600.

The client terminal 800, details of which are described later, has a control device that executes tuning to the hydraulic excavator 100. A staff person of the hydraulic excavator 100 operates the control device of the client terminal 800 to execute tuning of the hydraulic excavator 100 and then connects the client terminal 800 to the network 400 to allow the control device of the client terminal 800 to cause the information relating to the tuning to be transmitted to the server 500. The control device at the server 500 stores, in addition to the sensor outputs, the information relating to the tuning received from the client terminal 800 at the sensor information database 600.

The control device at the server 500 creates a report that indicates the state of each hydraulic excavator 100 based on the information such as the sensor outputs stored at the sensor information database 600 or the information relating to the tuning and transmits the created report via the network 400. The control device at the server 500 determines transmission targets to which the report is transmitted based on the contents of the contract information database 700. The report is transmitted to, for instance, an information terminal 900 that the seller of the hydraulic excavator 100 uses, an information terminal 900 that the purchaser (manager), the operator or the like of the hydraulic excavator 100 uses and is brought up on display at the display screen of the information terminal.

(Explanation on the Arrangement of the Hydraulic Excavator 100)

Figure 2:
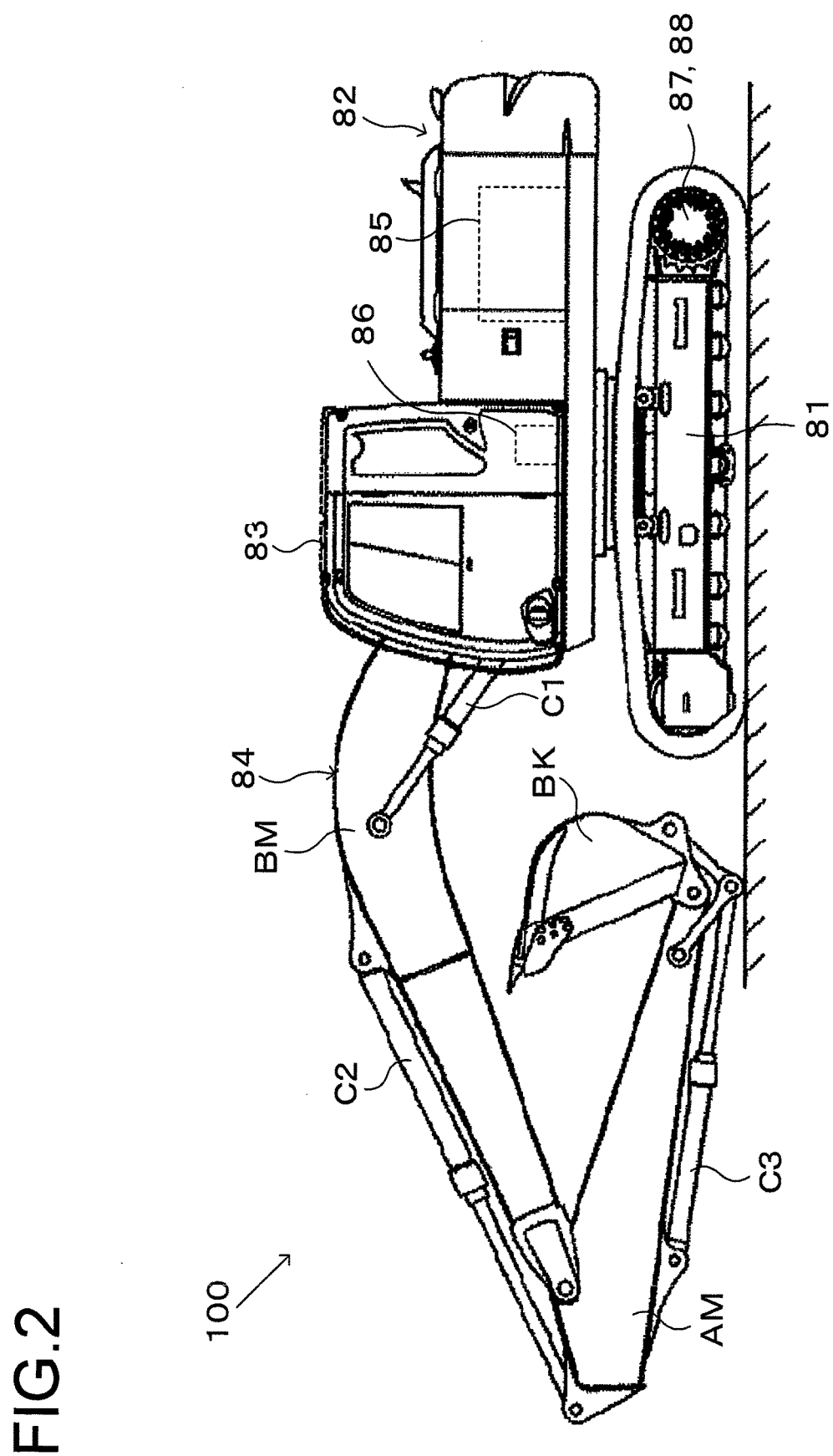
FIG. 2 is a schematic diagram showing the arrangement of a hydraulic excavator.

FIG. 2 is a schematic diagram showing the hydraulic excavator 100. The hydraulic excavator 100 includes a traveling lower-structure 81 and a swinging upper-structure 82 coupled to an upper part of the traveling lower-structure 81. The swinging upper-structure 82 is rotatable with respect to the traveling lower-structure 81. The swinging upper-structure 82 includes an operator's cab 83, a working device 84, an engine 85, and a swing hydraulic motor 86. The working device 84 includes a boom BM attached to the body of the swinging upper-structure 82, an arm AM coupled to the boom BM, and an attachment, for instance, a bucket, coupled to the arm AM. The boom BM is rotatable with respect to the body of the swinging upper-structure 82. The arm AM is rotatable with respect to the boom BM. The bucket BK is rotatable with respect to the arm AM. The boom BM is actuated by a boom cylinder C1 to move up and down. The arm AM is actuated by an arm cylinder C2 to perform crowd operation and dump operation. The bucket BK is actuated by a bucket cylinder C3 to perform crowd operation and dump operation. The traveling lower-structure 81 is provided with left and right traveling hydraulic motors 87 and 88, respectively.

Figure 3:
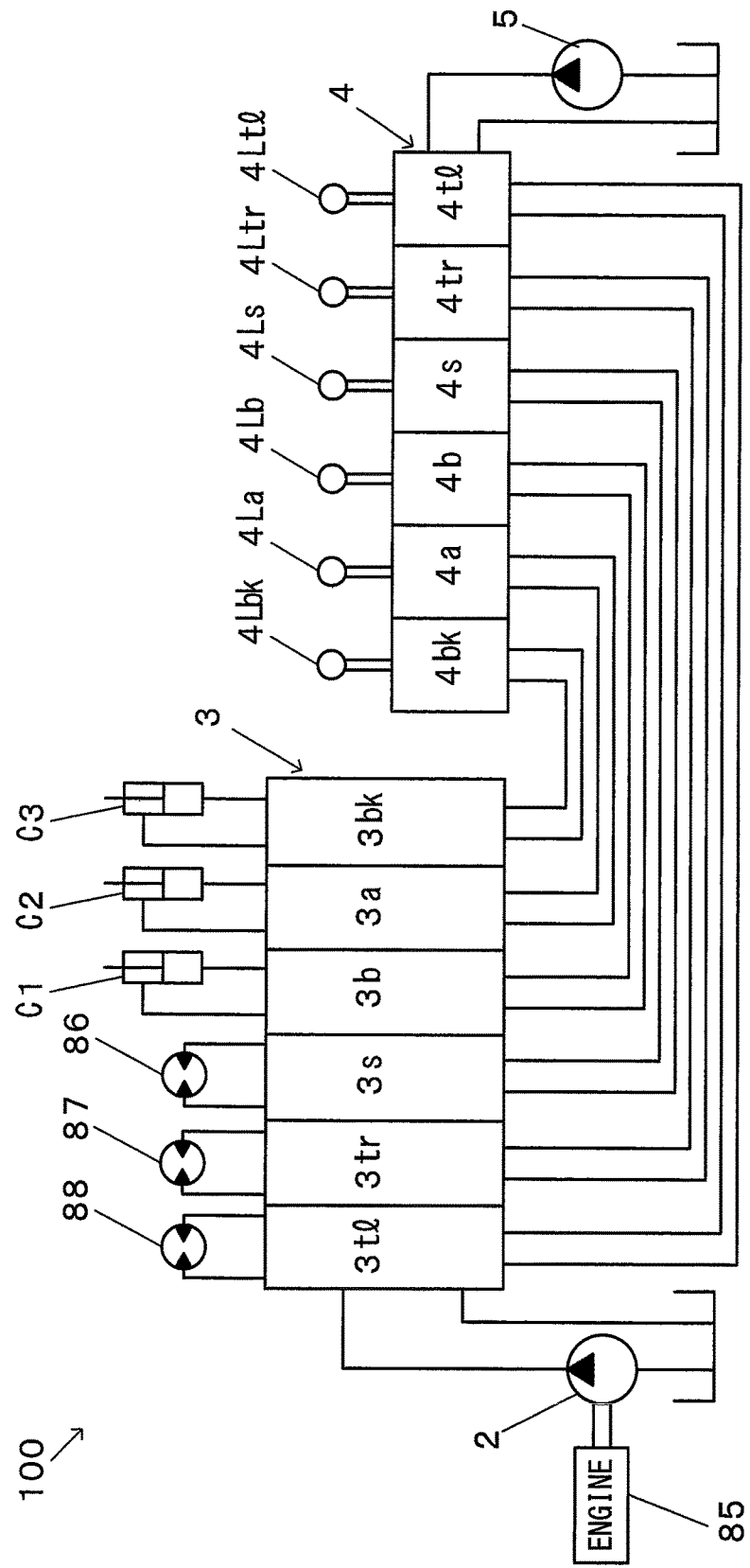
FIG. 3 is a schematic diagram showing an outline of a hydraulic circuit in the hydraulic excavator.

FIG. 3 is a schematic diagram showing an outline of a hydraulic circuit in the hydraulic excavator. The engine 85 drives a hydraulic pump 2. The pressure fluid discharged from the hydraulic pump 2 is restricted for the direction and amount of discharge of the hydraulic fluid by a plurality of control valves 3s, 3tr, 3tl, 3b, 3a, and 3bk to drive the swing hydraulic motors 86 on the both sides, the left and right traveling hydraulic motors 87, 88, respectively, and the hydraulic cylinders C1, C2, and C3. The control valves 3s, 3tr, 3tl, 3b, 3a, and 3bk, respectively, are switched with pilot pressures supplied from a plurality of corresponding pilot valves 4s, 4tr, 4tl, 4b, 4a, and 4bk. The pilot valves 4s, 4tr, 4tl, 4b, 4a, and 4bk each provided with pilot hydraulic pressure at a predetermined pressure from the pilot hydraulic pump 5 and output respective pilot pressures depending on the operation amount of operating levers 4Ls, 4Ltr, 4Ltl, 4Lb, 4La, and 4Lbk. The control valves 3s, 3tr, 3tl, 3b, 3a, and 3bk are consolidated into one valve block. Also, the pilot valves 4s, 4tr, 4tl, 4b, 4a, and 4bk are consolidated into one valve block.

Figure 4:
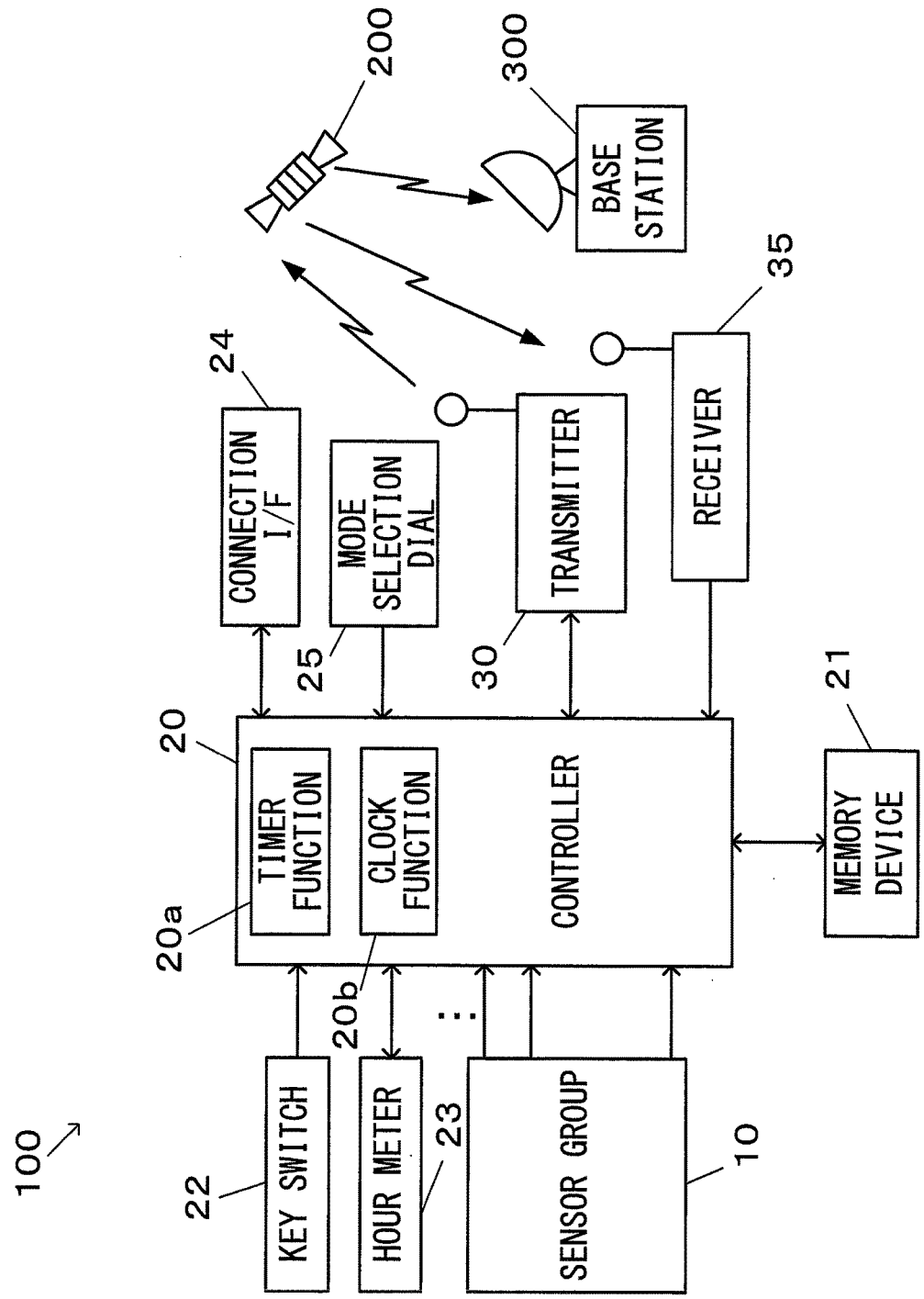
FIG. 4 is a block diagram showing a control system of a hydraulic excavator including a controller that detects the state of each unit of the hydraulic excavator and transmits state data (sensor output) of each unit to the server.

FIG. 4 is a block diagram showing a control system of a hydraulic excavator including a controller that detects the state of each unit of the hydraulic excavator via the sensor group 10 and transmits the obtained state data (sensor output) of each unit to the server. On the hydraulic excavator 100 are mounted a sensor group 10 including a plurality of sensors that detect the state of each unit of the hydraulic excavator 100, a controller 20, a memory device 21, a transmitter 30, and a receiver 35. The state detection signals output from the sensor group 10 are read in by the controller 20 at predetermined timing.

The controller 20 has a timer function 20a to measure a travel operation time, a swing operation time, and q front operation time for excavation. The controller 20 measures, by the timer function 20a, the travel operation time, the swing operation time, and the front operation time based on the read in state detection signals. These measured operation times are stored by the controller 20 at the memory device 21. The hydraulic excavator 100 has a key switch 22 that starts the engine 85 and an hour meter 23 that measures the operation time of the engine 85.

The controller 20 has a clock function 20b. The clock function 20b enables determination of on-time and off-time of the key switch 22 and engine start time and engine stop time. These times are stored by the controller 20 at the memory device 21. The values measured by the hour meter 23 are read in by the controller 20 at predetermined timing and stored at the memory device 21. The controller 20 causes the output of any other sensor included in the sensor group 10 (for instance, fuel injection quantity during the operation of the engine) to be stored at the memory device 21 as appropriate.

Figure 5:
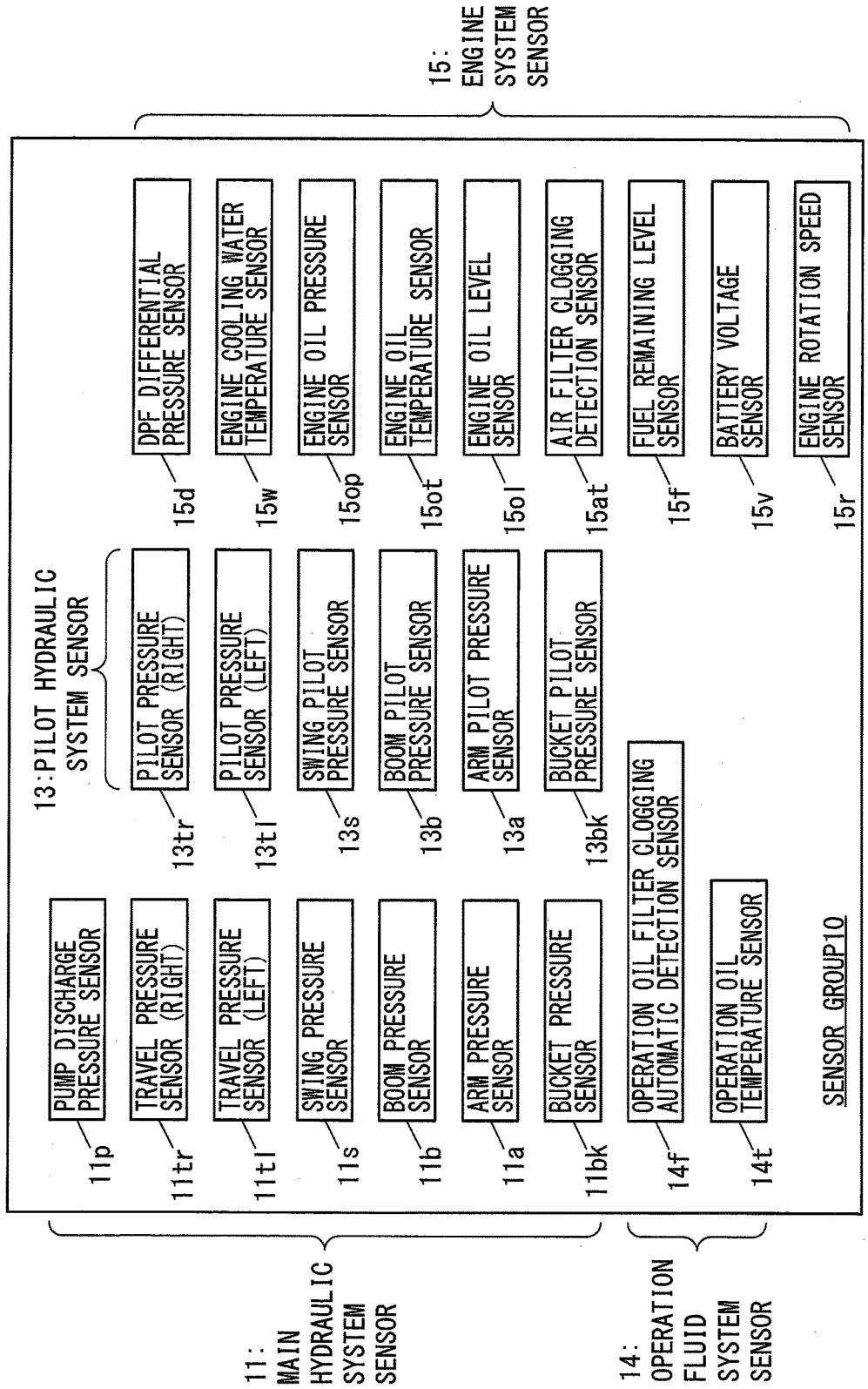
FIG. 5 is a diagram showing sensors included in a sensor group.

The controller 20 not only causes the state detection signals output from the sensor group 10 to be stored at the memory device 21 as state data (sensor outputs) but also creates new data from the sensor output and causes the new data to be stored at the memory device 21. Specifically, for any specified sensor output that deviates from a predetermined normal value to become an abnormal value, the controller 20 creates an alarm data suggesting a possibility that abnormality may occur in a region corresponding to the sensor output and causes the created data to be stored at the memory device 21. For instance, if the temperature of engine cooling water detected by an engine cooling water temperature sensor 15w, which is described later in reference to FIG. 5, is above a predetermined threshold value, the controller 20 creates an alarm data suggesting a possibility that abnormality may occur in the cooling system of the engine and causes the created alarm data to be stored at the memory device 21.

The controller 20 transmits each pieces of the data stored in the memory device 21 (e.g., sensor output, travel operation time, swing operation time, front operation time, key switch-on time, and alarm data) at predetermined timing via a transmitter 30. For instance, the alarm data, which suggests a possibility that abnormality may occur, desirably is transmitted promptly. As soon as the memory device 21 stores any alarm data, the controller 20 transmits the alarm data. The operation times and the key switch-on time and the like are less imperious. Accordingly, the controller 20 transmits such less imperious data regularly (e.g., once for each period of time ranging from every several minutes to several hours).

The electric waves transmitted from the transmitter 30 are received by the base station 300 via the communication satellite 200. To the controller 20 is connected a receiver 35 too. The receiver 35 receives signals transmitted from the base station 300 via the communication satellite 200 and transmits the received signals to the controller 20.

The hydraulic excavator 100 includes a connection interface (I/F) 24 that connects the hydraulic excavator 100 to the client terminal 800. The connection interface 24 is an intermediary interface for the communication between the client terminal 800 and the controller 20. To the controller 20 is further connected a mode selection dial 25. The mode selection dial 25 is an operation member that selects the operation mode of the hydraulic excavator 100. If the operator of the hydraulic excavator 100 operates the mode selection dial 25, a signal corresponding to the operation is transmitted. The controller 20 determines the operation mode of the hydraulic excavator 100 based on the operation signal.

In this embodiment, the hydraulic excavator 100 has two operation modes, i.e., a power mode (hereafter, referred to as "P mode") and an economy mode (hereafter referred to as "E mode"). That is, the mode selection dial 25 is an operation member that selects one of the P mode and the E mode alternatively. The controller 20 causes the engine 85 to operate at different rotation number (or rotation speed) and/or torque depending on whether the hydraulic excavator 100 operates in the P mode or the E mode. Specifically, the hydraulic excavator 100 operates at higher output upon a P mode operation than upon an E mode operation. Consequently, upon a high load operation in which high output is required, it is desirable that the operation mode of the hydraulic excavator 100 be set to the P mode at the controller 20. The hydraulic excavator 100 operates more fuel-efficiently when it operates in the E mode than in the P mode. In other words, the P mode is a relatively high output, high fuel-consumption (fuel-inefficient) operation mode whereas the E mode is a relatively low output, low fuel-consumption (fuel-efficient) operation mode.

The memory device 21 stores the control values of the rotation numbers (rotation speeds) of the engine 85 and the discharge volume (displacement) of the hydraulic pump 2 for each of the P mode and the E mode, respectively. The controller 20, when it is set at the P mode, reads out the control values of the rotation number of the engine 85 and the discharge volume of the hydraulic pump 2 corresponding to the P mode from the memory device 21 and controls the engine 85 and the hydraulic pump 2 based on the read-out numerical values (i.e., the control values of the rotation number of the engine 85 and the discharge volume of the hydraulic pump 2). The controller 20, when it is set to the E mode, reads out respective values (i.e., the control values of the rotation number of the engine 85 and the discharge volume of the hydraulic pump 2) corresponding to the E mode from the memory device 21 and controls the engine 85 and the hydraulic pump 2 based on the read-out values.

FIG. 5 is a diagram showing sensors included in the sensor group 10. The sensor group 10 includes pressure sensors (main hydraulic system sensors) that detect the pressure state of the main hydraulic circuit system 11. The pressure sensors 11 include a pressure sensor 11$p$ that measures the discharge pressure of the hydraulic pump 2 as shown in FIG. 3, pressure sensors 11$tr$ and 11$tl$, respectively, that measure the drive pressures of the traveling hydraulic motors 87 and 88 as shown in FIGS. 2 and 3, a pressure sensor 11$s$ that measures a drive pressure of a swing hydraulic motor 86, a pressure sensor 11$b$ that measures a drive pressure of a boom hydraulic cylinder C1 as shown in FIG. 3, a pressure sensor 11$a$ that measures a drive pressure of an arm hydraulic cylinder C2 as shown in FIG. 3, and a pressure sensor 11$bk$ that measures a drive pressure of a bucket hydraulic cylinder C3.

The sensor group 10 also includes pressure sensors 13 that detect the pressure state of the pilot hydraulic circuit system (pilot hydraulic system sensors). The pressure sensors 13 include pressure sensor 13$tr$ and 13$tl$ that measure, respectively, pilot pressures Ptr and Ptl output from traveling hydraulic pilot pressure valves 4$tr$ and 4$tl$, respectively, a pressure sensor 13$s$ that measures pilot pressure Ps output from a swing hydraulic pilot valve 4$s$ as shown in FIG. 3, a pressure sensor 13$b$ that measures a pilot pressure Pb output from a boom hydraulic pilot valves 4$b$ as shown in FIG. 3, a pressure sensor 13$a$ that measures a pilot pressure Pa output from an arm hydraulic pilot valves 4$a$ as shown in FIG. 3, and a pressure sensor 13$bk$ that measures a pilot pressure 4$bk$ output from a bucket hydraulic pilot valve Pbk as shown in FIG. 3.

The travel operation time is obtained by accumulating time segments in which the pressure Ptr or Ptl, respectively, detected by the traveling pilot pressure sensor 13$tr$ or 13$tl$ is equal to or higher than a predetermined value. The swing operation time is obtained by accumulating time segments in which the pressure Ps detected by the swing pilot pressure sensor 13$s$ is equal to or higher than a predetermined value. The front operation time is obtained by accumulating time segments in which any one of the pressures Pb, Pa, and Pbk, respectively, detected by the boom, arm, and bucket pilot pressure sensors 13$b$, 13$a$, and 13$bk$ is equal to or higher than a predetermined value.

The sensor group 10 also includes operation fluid system sensors 14, i.e., a pressure sensor 14$f$ that detects clogging of a filter arranged in a main hydraulic line and a temperature sensor 14$t$ that detects the temperature of operation fluid with which the hydraulic or the hydraulic cylinder is driven. The sensor group 10 further includes various types of engine system sensors 15. The engine system sensors 15 include a diesel particulate filter (DPF) differential pressure sensor 15$d$ that detects a front-and-back pressure difference between the upstream side and the downstream side of a DPF that collects particulate matter (PM) contained in exhaust gas, a cooling water temperature sensor 15$w$ that detects the temperature of cooling water for the engine 85, an engine oil pressure sensor 15$op$ that detects the pressure of engine oil, an en engine oil temperature sensor 15$ot$ that detects the temperature of engine oil, an engine oil level sensor 15$ol$ that detects the level of engine oil, a clogging sensor 15$af$ that detects the clogging of an air filter, a fuel remaining level sensor 15$f$ that detects the remaining level of fuel, a battery voltage sensor 15$v$ that detects the charge voltage of a battery, and a rotation speed sensor 15$r$ that detects an engine rotation speed (number).

(Explanation of Arrangement of Server 500)

Figure 6:
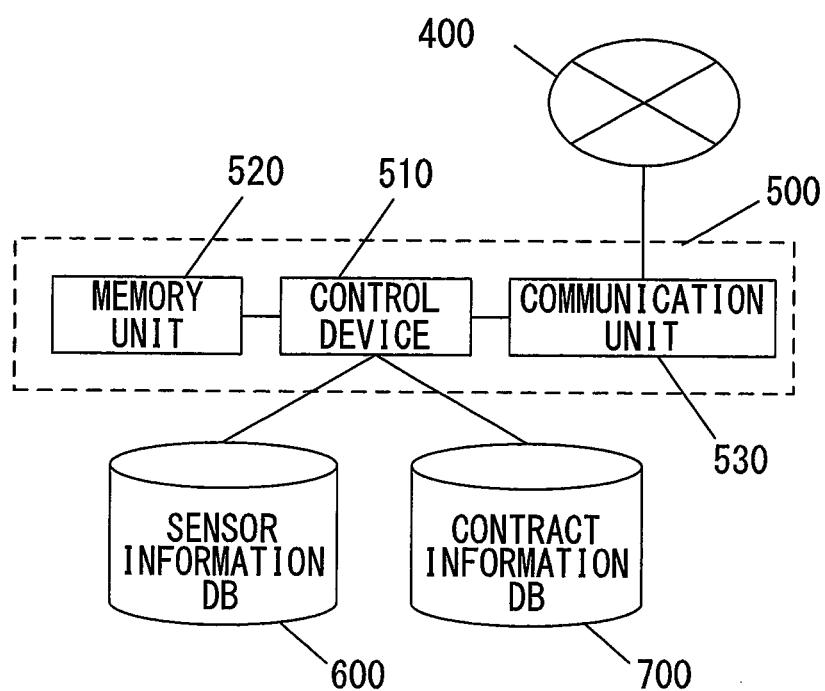
FIG. 6 is a schematic diagram showing the arrangement of a server.

FIG. 6 is a schematic diagram showing the arrangement of the server 500. The server 500 includes a control device 510, a memory unit 520, and a communication unit 530. The control device 510 includes a microcomputer and its peripheral circuitry, which are not shown in the figures. The control device 510 reads in and executes a control program that is stored at the memory unit 520 in advance to control each of the units of the server 500. The memory unit 520 is constituted by a non-volatile memory device, for instance, a fixed disk drive. The communication unit 530 performs data communication via the network 400 following a predetermined procedure.

To the control device 510 are connected a sensor information database 600 and a contract information database 700. The following explains the contents of each of the databases with examples.

FIG. 7 is a diagram showing an example of data stored in the sensor information database 600. A wide variety of types of data is transmitted from one hydraulic excavator 100 to the server 500 via the base station 300 and FIG. 7 shows only a portion of such types.

The control device 510 at the server 500 stores, at the sensor information database 600, data type 630 and data value 640 of the data received from the hydraulic excavator 100 via the base station 300, time and date of reception 610 of the received data, working machine ID 620 unique to the hydraulic excavator 100 with the controller 20 that transmitted the data, with these pieces of information being related with each other. FIG. 7 shows an example of the data type 630 listing up hour meter, elapsed time (cumulative total) after the purchase of the hydraulic excavator 100, engine start time, engine stop time, fuel discharge volume of the engine 85 during a period from the engine start time to the engine stop time.

At the sensor information database 600 is also stored tuning information transmitted from the client terminal 800. The control device 510, upon storage of the tuning information at the sensor information database 600, assigns the data type 630 with "tuning information", the data value 640 with the contents of the tuning information, the time and date of reception 610 with the time and date of reception of the tuning information, and the working machine ID 620 with the working machine ID unique to the hydraulic excavator 100 subjected to the tuning. The tuning information is described in detail later.

An example of a maintenance and related services contract in this embodiment is explained before the contents of the contract information database 700 are explained.

A purchaser (manager) of the hydraulic excavator 100 may conclude a maintenance and related services contract for the hydraulic excavator 100 with the seller of the hydraulic excavator 100. The maintenance and related services contract for the hydraulic excavator 100 includes an individual contract covering one of elements relating to the maintenance and related services separately and a comprehensive contract covering a plurality of such individual contracts as one package. In this embodiment, individual contracts include a long-term guarantee contract, a maintenance contract, a data report contract, and a tuning contract. These individual contracts are concluded for each hydraulic excavator 100 and the purchaser (manager) of the hydraulic excavator 100 may freely select which of the individual contracts to be concluded for each hydraulic excavator 100. The comprehensive contract, which covers all these individual contracts, is concluded for each hydraulic excavator 100. The contract information database 700 connected to the server 500 stores contract information indicating what contract is concluded for each hydraulic excavator 100.

The long-term guarantee contract is a contract by which a certain level of performance of or repair or exchange of specified parts or the like of the hydraulic excavator 100 is guaranteed for a longer period than the period by an ordinary contract upon payment of a certain amount of fee in advance. The maintenance contract is a contract by which supply or exchange of specified expendables of the hydraulic excavator 100 at specific intervals is guaranteed upon payment of a certain amount of fee in advance. The data report contract is a contract by which a report of the operation state of the hydraulic excavator 100 is regularly provided (or delivered) from the server 500. The tuning contract is a contract by which tuning using the client terminal 800 is provided for the hydraulic excavator 100.

FIG. 8 is a diagram showing an example of data stored in the contract information database 700. The contract information database 700 stores, for each hydraulic excavator 100, a working machine ID 710 of the hydraulic excavator 100, customer information 720 relating to a purchaser (or manager) who purchased (or who holds) the hydraulic excavator 100, and contractual coverage 730 and contract term 740 of the maintenance and related services contract concluded between the purchaser (or manager) and the seller of the hydraulic excavator 100, with these pieces of information being related to each other. One of the parties who concluded the maintenance and related services contract for the hydraulic excavator 100 is the purchaser of the hydraulic excavator 100 and the other of such parties is the seller of the hydraulic excavator 100. In case any one of the data report contract and the comprehensive contract is concluded, the database 700 stores a first delivery target address 750, i.e., an e-mail address of a delivery target to which the report created at the server 500 is delivered together with a first language 760 that indicates the language used in the report transmitted to the target of delivery. In the first delivery target address 750, for instance, e-mail addresses of the purchaser (or manager), the operator and the like of the hydraulic excavator 100 are set in advance. The contract information database 700 further stores a second delivery target address 770 together with a second language 780 that indicates the language used in the report transmitted to the second delivery target address 770. In the second delivery target address 770, e-mail addresses of the seller (for instance, business base such as an agent) are set in advance.

Although details are explained later, the server 500 is capable of creating a plurality of types of reports. The report created at the server 500 is transmitted to the purchaser or the seller or both of them depending on the type of the report of interest.

(Explanation of the Arrangement of the Client Terminal 800)

Figure 9:
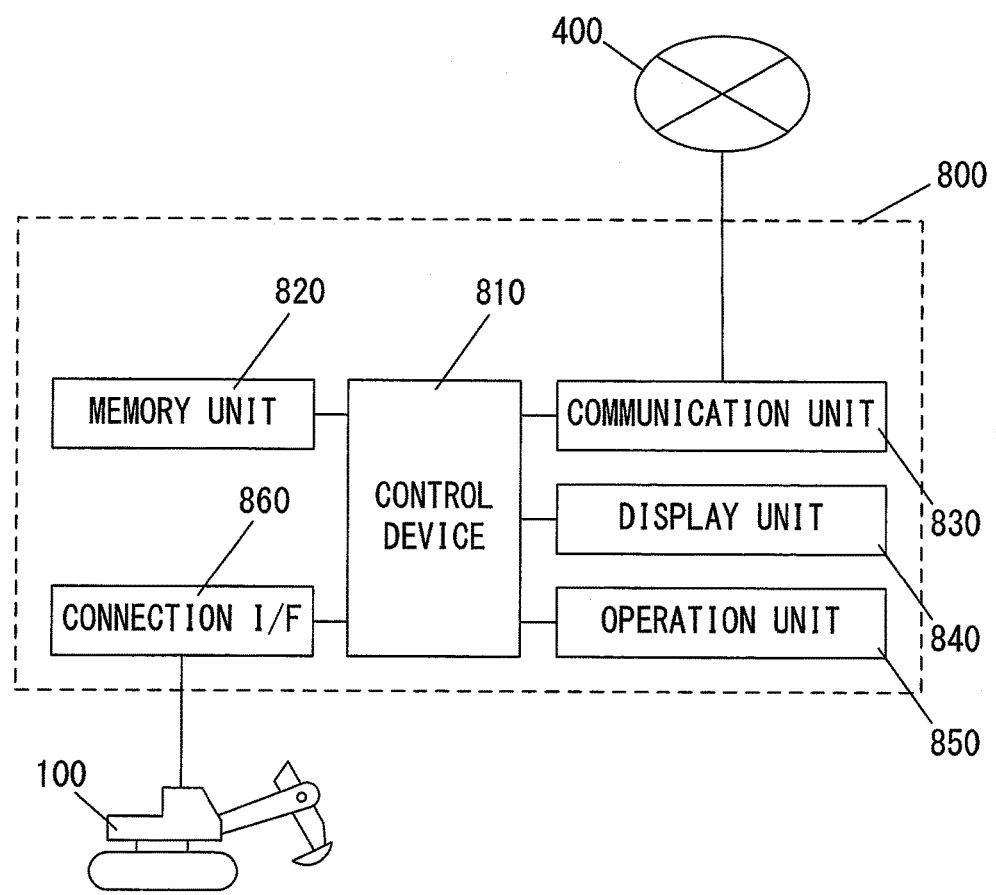
FIG. 9 is a diagram showing the arrangement of a client terminal.

FIG. 9 is a schematic diagram showing the arrangement of the client terminal 800. The client terminal 800 includes a control device 810, a memory unit 820, a communication unit 830, a display unit 840, an operation unit 850, and a connection interface (I/F) 860.

The control device 810 includes a microcomputer and its peripheral circuitry, which are not shown in the figures. The control device 810 reads in and executes a control program that is stored at the memory unit 820 in advance to control each of the units of the client terminal 800. The memory unit 820 is constituted by a non-volatile memory device, for instance, a fixed disk drive. The communication unit 830 performs data communication via the network 400 following a predetermined procedure.

The display unit 840 is constituted by a display device, for instance, a liquid crystal display. The operation unit 850 includes an operation member, for instance, a keyboard, a mouse, or a touch panel and sends an operation signal to the control device 810 in response to an operation performed to the operation member by a user (maintenance staff). The connection interface 860 is an interface that connects the hydraulic excavator 100. The control device 810 of the client terminal 800 performs mutual communication with the controller 20 of the hydraulic excavator 100 connected through an connection interface 860 to enable, for instance, the contents of the memory at the memory device 21 to be rewritten through the controller 20.

Figure 10:
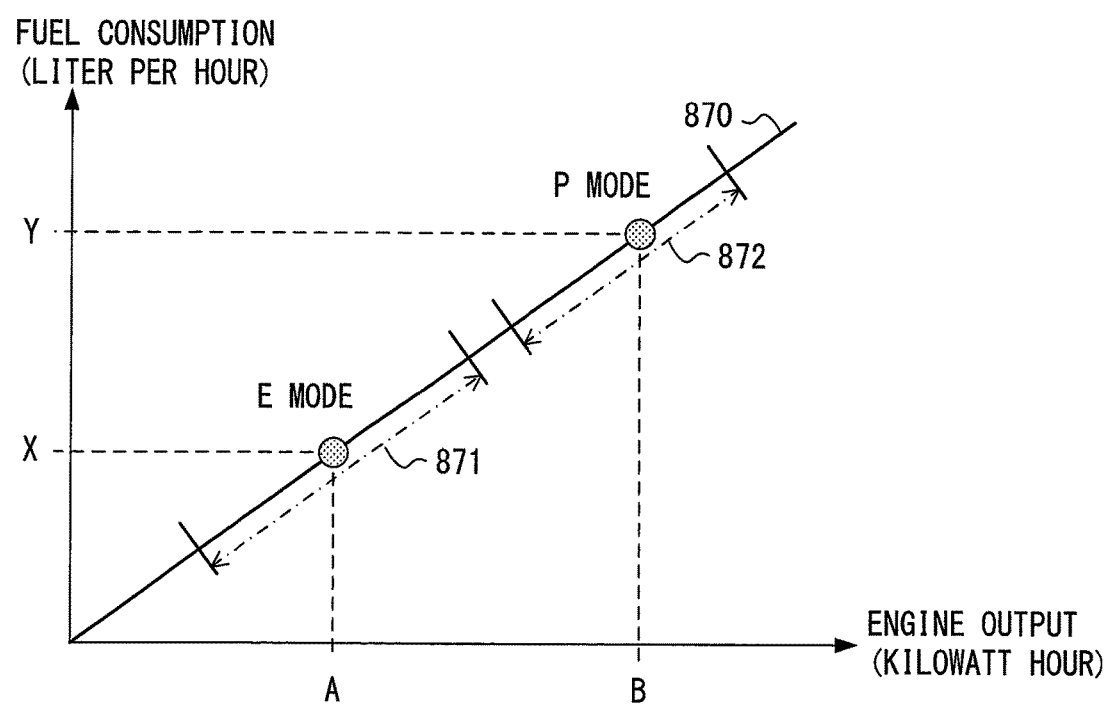
FIG. 10 is a schematic diagram explaining the concept of tuning.

The tuning of the hydraulic excavator 100 using the client terminal 800 is explained. FIG. 10 is a schematic diagram explaining the concept of tuning. The horizontal axis represents engine output (kilowatt hour) and the vertical axis represents fuel consumption per unit time (liter per hour), i.e., fuel efficiency. The hydraulic excavator 100 has an engine output vs. fuel efficiency relationship that is substantially linear as indicated by straight line 870 as shown in FIG. 10. That is, an increased engine output increases fuel consumption per unit time and conversely, a decreased engine output leads to a decreased fuel consumption per unit time.

For the hydraulic excavator 100 upon shipment, the control values of the rotation number of the engine 85 and of the discharge volume of the hydraulic pump 2 in the E mode are set so that in the E mode the engine output is a predetermined value A and the fuel efficiency is a predetermined value X. For the hydraulic excavator 100 upon shipment, the control values of the rotation number of the engine 85 and of the discharge volume of the hydraulic pump 2 in the P mode are set so that in the P mode the engine output is a predetermined value B, which is larger than the predetermined value A, and the fuel efficiency is a predetermined value Y, which is larger than the predetermined value X. Specifically, the control values of the rotation number of the engine 85 and of the discharge volume of the hydraulic pump 2 for each of the P mode and the E mode are stored at the memory device 21.

The purchaser of the hydraulic excavator 100, for which the comprehensive contract or the individual contract that includes the tuning contract is concluded, may desire that tuning of the hydraulic excavator 100 be provided in the P mode or in the E mode. The tuning in this embodiment means rewriting the control values of the rotation number of the engine 85 and/or of the discharge volume of the hydraulic pump 2 upon operating in the P mode/E mode stored at the memory device 21. The tuning according to this embodiment performed on the hydraulic excavator 100 enables the output (fuel efficiency) upon the P mode operation to be varied up and down from a standard output (fuel efficiency) in the P mode and the output (fuel efficiency) upon the E mode operation to be varied up and down from a standard output (fuel efficiency) in the E mode. A tunable setting range 872 for the control values upon the P mode operation and a tunable setting range 871 for the control values upon the E mode operation have no crossover each other. The tunable setting range 872 upon the P mode operation includes set values of the control values for the P mode operation upon shipment. The tunable setting range 871 upon the E mode operation includes set values of the control values for the E mode operation upon shipment.

In response to any offer for receiving tuning made by the purchaser to the seller, the seller sends maintenance staff carrying a client terminal 800 to the site of installing the hydraulic excavator 100. The maintenance staff connects the client terminal 800 to the network 400 to download, from the server 500 to the client terminal 800, the contract information relating to the hydraulic excavator 100, which is the target of tuning, before he can move on to the site.

Upon receipt of a request for download from the control device 810 at the client terminal 800, the control device 510 at the server 500 reads out the contract information relating to the hydraulic excavator 100 corresponding to the request from the contract information database 700 and transmits the read-out information to the control device 810 at the client terminal 800. The control device 810 at the client terminal 800 stores, at the memory unit 820, the contract information received from the server 500. Subsequently, the maintenance staff carrying the client terminal 800 with him moves on to the site of installing the hydraulic excavator 100 and connects the client terminal 800 to the hydraulic excavator 100 through the connection interface 860. The maintenance staff inputs a command into the control device 810 at the client terminal 800 to execute tuning processing to the hydraulic excavator 100.

The control device 810 at the client terminal 800 refers to the contract information stored at the memory unit 820 in the tuning processing and determines whether tuning of the hydraulic excavator 100 to which the client terminal 800 is connected is permitted. If the contract information stored at the memory unit 820 includes any effective comprehensive contract or any effective tuning contract, the control device 810 determines that the tuning is permitted. If the control device 810 determines that the tuning is permitted, the control device 810 causes the engine rotation speed and/or torque of the hydraulic excavator 100 to be changed through the controller 20. In other words, the controller 20 rewrites the control values of the rotation number of the engine 85 and the discharge volume of the hydraulic pump 2 stored at the memory device 21 of the hydraulic excavator 100 into input values input by the maintenance staff into the control device 810 through the operation unit 850. Thus, achievement of the tuning of the hydraulic excavator 100 allows the control values of the rotation number of the engine 85 and the discharge volume of the hydraulic pump 2 of the hydraulic excavator 100 to be changed. The input values input by the maintenance staff into the control device 810 via the operation unit 850 to change the control values are stored by the control device 810 or the memory unit 820 as information relating to the contents of the tuning (tuning information).

The maintenance staff causes the control device 810 at the client terminal 800 to execute the tuning processing of the hydraulic excavator 100 and then connects the client terminal 800 to the network 400 again. The tuning information relating to the contents of the executed tuning is transmitted by the control device 810 from the client terminal 800 to the server 500 via the communication unit 830. The control device 510 at the server 500 adds, to the tuning information received via the communication unit 530, information such as the working machine ID that discriminates the hydraulic excavator 100 for which tuning was performed and the time and date of the tuning before the tuning information can be stored at the sensor information database 600.

The change of the torque can be performed as follows.

The displacement volume of the variable displacement hydraulic pump is regulated by a pump regulator. The hydraulic pump is supposed to be driven by so-called full horsepower control. The displacement volume is determined according to the discharge pressure of the hydraulic pump. The adjustment of the displacement volume is performed as follows. Drive control of the pump regulator based on measured values of pump discharge pressure according to a so-called PQ curve allows the displacement volume to be adjusted.

The product of pressure and discharge amount (=engine rotation speed×displacement volume of pump) is a physical quantity that corresponds to torque (hydraulic pump absorption horsepower). The discharge amount is a product of the engine rotation speed and the displacement volume of the pump. In this embodiment, two types of PQ curves, respectively, are defined for the P mode and the E mode. The two PQ curves are set so that the PQ curve for the P mode provides a greater torque than the PQ curve for the E mode.

The following explains an example of control to change torque by tuning. For instance, to increase torque at a constant engine rotation speed in the P mode, the pump discharge volume, which is determined from the pump discharge pressure based on the PQ characteristic curve selected for the P mode, may be increased. For instance, the regulator is controlled so that the tuning provides a pump volume that is equal to a value obtained by multiplying the determined pump discharge volume by a coefficient greater than 1.

(Explanation of Report)

Explanation is made on a report transmitted from the server 500 to the purchaser (or owner or holder), operator, or seller, or the like of the hydraulic excavator 100. The control device 510 at the server 500 creates three types of reports, i.e., a regular report, an emergency report, and an important report and delivers them. In this embodiment, the control device 510 at the server 500 creates the three types of reports for each hydraulic excavator 100. However, the control device 510 may be configured to create a single report addressed to a purchaser of a plurality of hydraulic excavators 100 or a seller of a plurality of hydraulic excavators 100, the report relating to the plurality of hydraulic excavators 100 purchased by the purchaser or sold by the seller and deliver the created report to the purchaser or the seller.

(Explanation of Regular Report)

The regular report is a report that the control device 510 at the server 500 creates by collecting sensor outputs and the like for each predetermined period of time (a calendar month in this embodiment). The server 500 identifies the hydraulic excavator 100 for which a regular report is to be created referring to the contract information database 700 at the beginning of each month. Specifically, the control device 510 extracts records of any contract that is defined by the contractual coverage 730 to be either a comprehensive contract or a data report contract and that has the contract term 740 including the current date, i.e. Then, the hydraulic excavator 100 that corresponds to the working machine ID 710 contained in the records thus extracted is identified. The control device 510 creates a regular report that represents the operation state of the identified hydraulic excavator 100 for a preceding month in a language selected from the first language 760 and the second language 780 in the contract information database 700. The control device 510 at the server 500 delivers the created report in the form of an e-mail to the target of the delivery (the purchaser and the seller, respectively, who are each the party to the contract) set in advance in the first delivery target address 750 and the second delivery target address 770 in the contract information database 700.

The regular report is a report that verifies the operation state of the hydraulic excavator 100 for a fixed period of time and thus is less urgent than any other report that is described later. Consequently, the control device 510 at the server 500 avoids the need to transmit the regular report as soon as it is created. The control device 510 may be configured to delay transmission of the regular report until a time zone (for example, late night, early morning or the like) in which the network 400 operates at a low communication amount. For the same regular report, the timing at which the control device 510 transmits it to the purchaser may be different from the timing at which the control device 510 transmits it to the seller.

Figure 11:
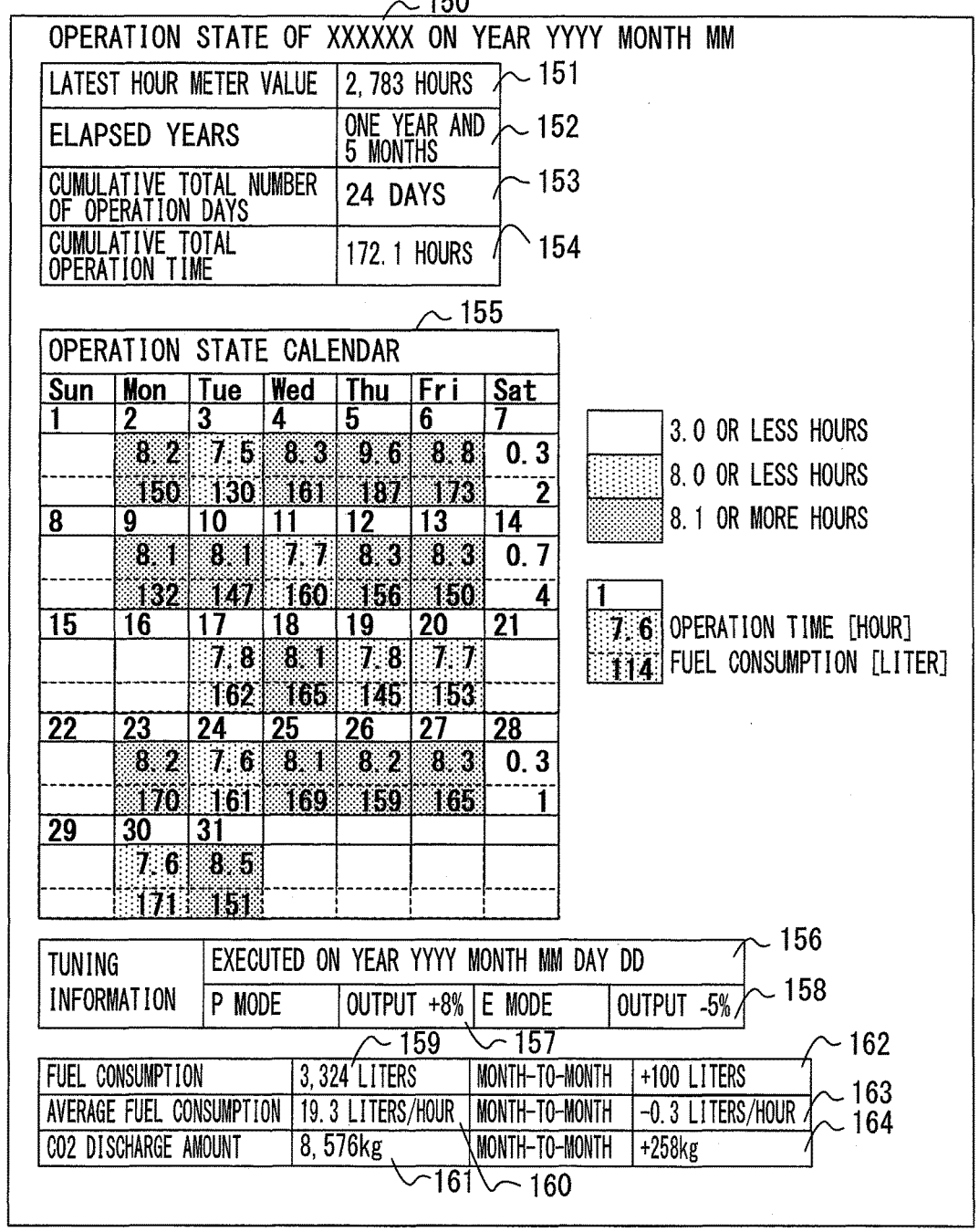
FIG. 11 is a diagram showing an example of the format of a regular report.

FIG. 11 is a diagram showing an example of the format of a regular report. The regular report 150 includes a latest hour meter value 151, elapsed years 152 after purchase of the hydraulic excavator 100, cumulative total number of operation days 153 of the hydraulic excavator 100, cumulative total operation time 154 of the hydraulic excavator 100 at a target month for creation of the report, a fuel efficiency calendar (operation state calendar) 155 of the hydraulic excavator 100, cumulative total fuel consumption 159 of the hydraulic excavator 100 at a target month for creation of the report, average daily fuel consumption 160 (temporal fuel efficiency) of the hydraulic excavator 100 at a target month for creation of the report, and a $CO_2$ discharge amount 161 calculated based on the cumulative total fuel consumption of the hydraulic excavator 100. Regarding the cumulative total fuel consumption 159 of the hydraulic excavator 100 at a target month for creation of the report, the average daily fuel consumption 160 of the hydraulic excavator 100 at a target month for creation of the report, and the $CO_2$ discharge amount 161 calculated based on the cumulative total fuel consumption of the hydraulic excavator 100, differential values 162, 163, and 164 (decreased or increased values) as compared with the values of the preceding month are also included in the regular report 150.

If the hydraulic excavator 100, which is a target of report creation, has received the tuning as described above, the regular report 150 indicates the date of tuning 156, and the contents of the P mode tuning 157 and the contents of the E mode tuning as the tuning information.

The fuel efficiency calendar 155 included in the regular report 150 indicates operation time and fuel consumption of the hydraulic excavator 100 for the predetermined period of time, i.e., within the calendar month on a daily basis in block. Specifically, the fuel efficiency calendar 155 indicates a first region, which is a date indicating region in which a value of date (i.e., 1 for day 1, 2 for day 2, etc.) is indicated, a second region provided adjacent to the first region, which is an item indicating region that indicates operation time on the date, a third region provided adjacent to the second region, which is an item indicating region that indicates fuel consumption on the date, arranged in the form of a matrix in numbers corresponding to the number of days in the calendar month. For instance, on the date: year YYYY month MM day 2 (Mon) as exemplified in FIG. 11, it is indicated that the operation time is 8.2 hours and the fuel consumption is 150 liters. Whereas, on the non-operation day such as year YYYY month MM day 1 (Sun), both the operation time and the fuel consumption are left blank. Thus, the fuel efficiency calendar 155 enables one to grasp at a glance whether operation or non-operation, daily operation time and corresponding daily fuel consumption. The daily operation time is calculated by accumulating the operation time from the engine start time to the engine stop time of the hydraulic excavator 100 daily. In this embodiment, each column or field corresponding to each date has a background color that is darker for a longer operation time. This enables one to grasp at a glance whether the cumulative total operation time for the month in whole is relatively long and whether the daily operation time is relatively long. The background color may be varied based on the daily fuel consumption or hourly fuel consumption instead of the daily operation time.

As mentioned above, the information including sensor outputs collected from the hydraulic excavator 100 is stored at the sensor information database 600. This allows the control device 510 to create each item of the regular report 150 based on the stored information. For instance, the latest hour meter value 151 can be identified by causing the control device 510 to make a search, at the sensor information database 600, for a newest one out of the hour meter values that have been received by the control device 510 from the hydraulic excavator 100 and to describe the identified newest hour meter value in the regular report 150. The other items can be similarly created from the information including, for instance, sensor outputs accumulated in the sensor information database 600.

Figure 12:
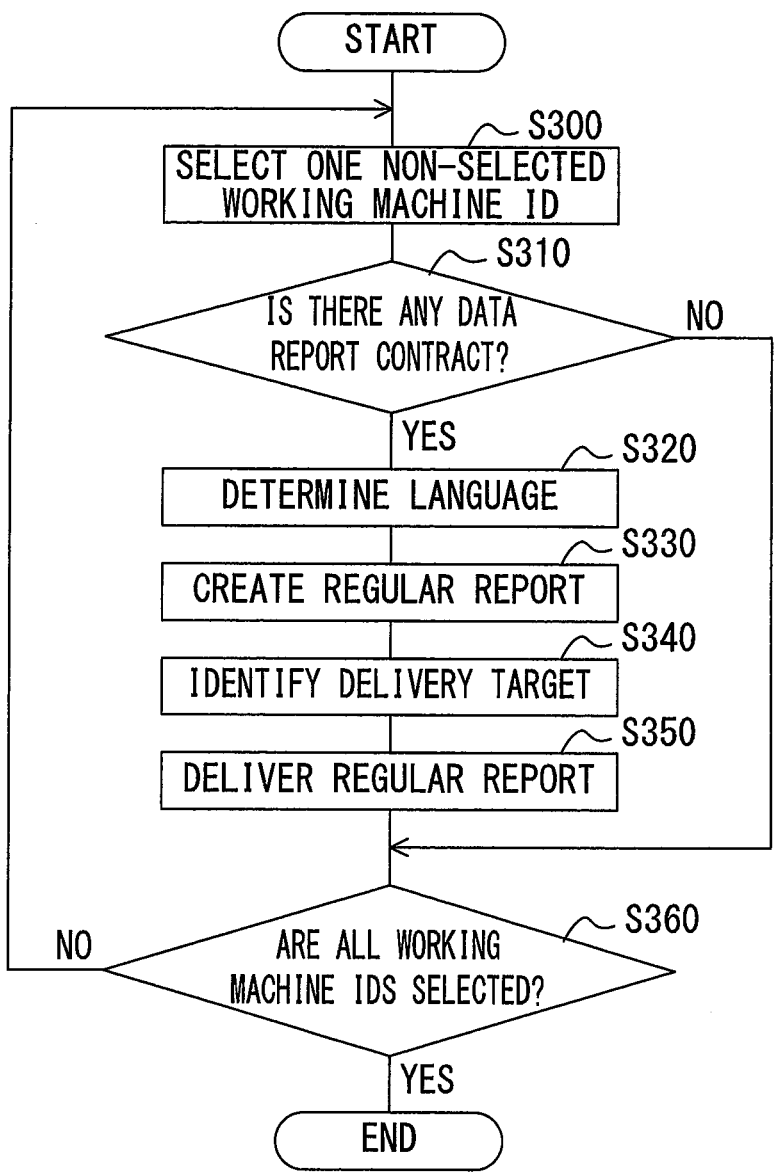
FIG. 12 is a flowchart of regular report delivery processing executed by the control device at the server.

FIG. 12 is a flowchart of regular report delivery processing executed by the control device at the server. In step S300, the control device 510 selects one working machine ID unselected in this regular report delivery processing from the working machine IDs of all the hydraulic excavators 100 that are under the control of the control device 510. The processing in steps S310 to S350 is executed on the hydraulic excavator 100 that has the working machine ID thus selected.

In step S310, the control device 510 searches the working machine ID selected in step S300 at the contract information database 700 and determines whether there is a comprehensive contract including a data report contract or an individual data report contract corresponding to the identified working machine ID within a valid term. If such a contract is absent, the control device 510 causes the control to proceed to step S360. If it is determined that a valid contract is present in step S310, the control device 510 causes the control to proceed to step S320.

In step S320, the control device 510 refers to the first language 760 and the second language 780 in the contract information database 700 and determines the language for use in the regular report 150 to be created this time. In the processing in step S400 described later referring to FIG. 15, the sensor output data transmitted from the hydraulic excavator 100 is received by the control device 510. The sensor output data received by the control device 510 in the processing in step S410 is stored by the control device 510 at the sensor information database 600. In step S330, the control device 510 refers to the sensor information database 600 and creates the regular report 150 based on the sensor output data stored at the sensor information database 600. If the first language 760 and the second language 780 differ from each other, two respective regular reports 150 that correspond to the first and the second languages are created. The two regular reports 150, which differ in the language used for description from each other, describe the same information.

In step S340, the control device 510 refers to the first delivery target address 750 and the second delivery target address 770 in the contract information database 700 and identifies a delivery target to whom the regular report 150 created this time is to be delivered. In step S350, the control device 510 delivers the regular report 150 created in step S330 to the delivery target identified in step S340 via the communication unit 530.

In step S360, the control device 510 determines whether the working machines ID of all the hydraulic excavators 100 that are under the control of the control device 510 are selected in step S300. If any unselected hydraulic excavator 100 remains, the control device 510 causes the control to return to step S300 to repeat the processing in step S300 and subsequent steps. The control device 510 ends the processing illustrated in FIG. 12 when all the hydraulic excavators 100 are already selected.

(Explanation of Emergency Report)

The emergency report is a report that issues an alarm that some abnormality occurs. The control device 510 at the server 500, upon receipt of a sensor output or the like transmitted from the hydraulic excavator 100, stores the received information at the sensor information database 600 and at the same time tries to detect abnormality data from the received information. The abnormality data is data that indicates occurrence of abnormality that would be an obstacle to normal operation of the hydraulic excavator 100, for instance, failure or malfunction of the cooling system, failure or malfunction of the engine 85, etc.

The control device 510 at the server 500 detects abnormality data based on, for instance, the alarm data transmitted from the hydraulic excavator 100 and the sensor output data transmitted from the hydraulic excavator 100. Hereafter, explanation is made on the processing of detecting abnormality data with concrete examples.

(1) Regeneration Mechanism for DPF

The engine 85 of the hydraulic excavator 100 is provided with a diesel particle filter (DPF) in an elimination route for exhaust gas. The DPF differential pressure sensor 15d detects a difference between the pressures across the DPF. This difference in pressure represents the amount of sediment of the PM at the DPF (degree of clogging of the DPF). The detected amount of sediment of the PM is transmitted to the server 500 as sensor output data for each occurrence of a change in the amount of sediment of the PM greater than a predetermined value.

The controller 20 of the hydraulic excavator 100 executes control of regeneration of the DPF to eliminate the clogging of the DPF. The regeneration control is executed by the controller 20. In this control, the controller 20 executes post injection in the engine or causes the engine to operate at a higher rotation speed to increase the temperature of exhaust gas that passes through the DPF, thereby burning the PM. The controller 20 is capable of executing two types of regeneration control, i.e., a temporal regeneration control, which is automatically executed for each predetermined period of time and a manual regeneration control executed by a manual operation by the operator of the hydraulic excavator 100.

The regeneration control may influence the operation of the hydraulic excavator 100, for instance, to decrease fuel efficiency or decrease the output power of the engine 85. In the temporal regeneration control, the controller 20 executes a control that reduces such an influence although it has a small effect of regeneration of the DPF. In the manual regeneration control, the controller 20 executes a control that provides a large regeneration effect. This control, however, gives an influence on the operation of the hydraulic excavator 100 stronger than the influence in the temporal regeneration control, for instance, failure of work using the hydraulic excavator 100 or the content of the work using the hydraulic excavator 100 being limited.

Upon completion of the execution of the regeneration control, the controller 20 transmits, to the control device 510 at the server 500, data indicating that the execution of the regeneration control is completed together with the sensor output data of the amount of sediment of the PM detected by the DPF differential pressure sensor 15d after the completion of the regeneration. The control device 510 at the server 500 detects, as abnormality data, data indicating that the amount of sediment of the PM at the time of completion of the temporal regeneration control is greater than a predetermined threshold value, i.e., data indicating that the amount of sediment of the PM is insufficiently decreased after the execution of the temporal regeneration control.

(2) Cooling Mechanism for Engine

The hydraulic excavator 100 detects the temperature of engine cooling water with a temperature sensor 15*w*. The hydraulic excavator 100 detects the temperature of operation oil with which the hydraulic motor or hydraulic cylinder is driven by the operation oil temperature sensor 14*t*. The hydraulic excavator 100 further detects outside air temperature at a place where the hydraulic excavator is operating by an outside air temperature sensor, which is not shown in the figures.

The sensor output data detected at the hydraulic excavator 100 is periodically transmitted to the server 500 by the controller 20 of the hydraulic excavator 100. The control device 510 at the server 500 calculates an average temperature of the engine cooling water from temperatures of the engine cooling water transmitted from the plurality of hydraulic excavators 100 (of the same model) within the last 1 hour. Similarly, average temperatures are calculated for the operation fluid and the outside air.

The control device 510 detects abnormality data for a certain hydraulic excavator 100 based on newest temperatures (engine cooling water temperature, operation fluid temperature, and outside air temperature) transmitted from the hydraulic excavator 100, the average temperatures of the respective newest temperatures, the temperatures transmitted from the hydraulic excavator 100 in the past and the like. For instance, if the cooling water temperature and the operation fluid temperature detected at a certain hydraulic excavator 100 are each considerably higher than an average value of temperatures detected at hydraulic excavators 100 of the same model as that of the certain hydraulic excavator 100 in the same time zone, the radiator of the certain hydraulic excavator 100 may be considerably clogged. To avoid occurrence of serious failure that would be caused by leaving this situation unaltered, the control device 510 is configured to detect data including the cooling water temperature and the operation fluid temperature detected at the certain hydraulic excavator 100 as abnormality data.

If the cooling water temperature in a hydraulic excavator 100 reaches a temperature equal to or higher than a predetermined temperature, the controller 20 at the hydraulic excavator 100 transmits an alarm data representing a warning of overheating to the server 500. If the cooling water temperature and the operation fluid temperature detected at a certain hydraulic excavator 100 are each close enough to an average value of temperatures detected at a plurality of hydraulic excavators 100 and yet alarm data representing a warning of overheating is transmitted from the certain hydraulic excavator 10, the control device 510 estimates that some abnormality is occurring in the electric system of the certain hydraulic excavator 100 and determines that abnormality data is detected.

As mentioned above, the control device 510 at the server 500 detects abnormality data representing abnormality that would be an obstacle to normal operation of the hydraulic excavator 100 based on the sensor output data and alarm data and the like collected from the hydraulic excavator 100.

The control device 510 uses different methods of detecting abnormality data for different types of sensor output data or alarm data by switching from one to another. FIG. 16 is a diagram illustrating the manner of switching the detection methods or modes in which abnormality data is determined to be detected by the control device depending on the result of distinguishing the data type of the sensor output or the like, showing details of the processing performed in step S430 in FIG. 15. For instance, upon determination that sensor output data of a certain type X exceeds a predetermined threshold value (positive determination in step S4310 within step S430), the control device 510 immediately determines that abnormality data is detected if the sensor output data of the type X exceeds the predetermined threshold value at least once (positive determination in step S4320, i.e., positive determination in step S430). For sensor output data of a type other than the type X, the control device 510 does not judge that abnormality data is detected until the sensor output data of the type other than the type X exceeds the predetermined threshold value three consecutive times (positive determination in step S4350, i.e., positive determination in step S430). This is because the reliability of the sensor output data depends on the type of the sensor. For instance, the sensor output data obtained by a sensor giving a big detection error is difficult to determine whether the detected value accidentally exceeded the threshold value due to a large error of the sensor output data or the detected value exceeded as a result of actually occurred abnormality. For sensor output data obtained by the sensor having such a large error, the control device 510 does not judge that abnormality data is detected until the sensor output data exceeds the predetermined threshold value a plurality of times consecutively. If negative determination is made in step S4310 or S4350, the control device 510 determines that no abnormality data is detected (negative determination in step S430). For sensor output data of another type Y a detection error magnitude of which differs from the detection error magnitude of the above types, the control device 510 may be configured to judge that abnormality data is detected based on whether the sensor output data exceeded the threshold value predetermined times within a fixed period of time in contrast to the judgment that abnormality data is detected based on whether the sensor output data exceeded the threshold value a plurality of times consecutively. That is, for any sensor output data that exceed the threshold value predetermined times within a fixed period of time (positive determination in step S4330), and if the type of the sensor output data is Y (positive determination in step S4340), the control device 510 determines that abnormality data is detected (positive determination in step S430).

FIG. 13(*a*) and FIG. 13(*b*) are diagrams showing examples of the format of an emergency report. The control device 510 at the server 500 according to this embodiment creates two types of emergency reports for the same abnormality data, i.e., a first emergency report 250 shown in FIG. 13(*a*) and a second emergency report 350 shown in FIG. 13(*b*).

The first emergency report 250 includes the working machine ID 251 that identifies the hydraulic excavator 100, which is an object of a report (the hydraulic excavator 100 in which abnormality occurs), and a content 252 of abnormality representing details of the abnormality. The control device 510 at the server 500 creates the first emergency report 250 in a language defined by the first language 760 in the contract information database 700 and delivers the created report to a delivery target (purchaser) based on the first delivery target address 750.

The second report 350 includes the working machine ID 351 that identifies the hydraulic excavator 100 (a hydraulic excavator 100 in which abnormality occurs), an alarm 352 representing the content of alarm data detected at the hydraulic excavator 100, a cause 353 that represents a cause of occurrence of abnormality, a specific countermeasure 354 representing a countermeasure to cope with the abnormality, manual information 355 including the page number of a manual containing a description relating to the coping process or URL for referring to the manual, and sensor output data 356. The control device 510 at the server 500 creates the second emergency report 350 in a language defined by the second language 780 in the contract information database 700 and delivers the created report to a delivery target (seller) based on the second delivery target address 770.

The second emergency report 350 shown in FIG. 13(*b*) contains more abundant description than the first emergency report 250 shown in FIG. 13(*a*). In other words, the second emergency report 350 has an amount of information larger than the amount of information of the first emergency report 250. This is because the seller needs to take appropriate measures (repair, etc.) corresponding to the abnormality data to the hydraulic excavator 100 and to know internal information of the hydraulic excavator 100, such as the sensor output data. Such internal information if presented to the purchaser is useless for the purchaser to solve his problem and only increases the complexity of the report. Consequently, such an internal information is eliminated from the first emergency report 350 transmitted to the purchaser.

(Explanation of Important Report)

The important report notifies that a sign leading to the occurrence of any abnormality is seen. The control device 510 at the server 500 tries detection of predictive data based on the information received from the hydraulic excavator 100 around the time when abnormality data is detected. The predictive data indicates the possibility of the occurrence of abnormality that would be an obstacle to the operation of the hydraulic excavator 100, for instance, failure of cooling system or failure of the engine 85, if use of the hydraulic excavator 100 as-is is continued.

For instance, if result of observation of tendencies of changes in intake-air temperature, operation fuel temperature, and cooling water temperature for the past one month at a certain hydraulic excavator 100 indicates that the intake-air temperature and the operation fuel temperature show each a downward tendency whereas the cooling water temperature shows an upward tendency, the performance of the cooling system of the hydraulic excavator 100 may have decreased. If this is left without any countermeasure, the cooling system will lose its cooling function to cause overheating or the like and thus will be an obstacle to the operation of the hydraulic excavator 100. As mentioned above, data, which represents a sign of abnormality that is likely to lead to actual abnormality in future, although it is unnecessary to take any immediate action to cope with it, is predictive data. The control device 510 detects such predictive data using the sensor output data, etc. of the hydraulic excavator 100 accumulated in the sensor information database 600 and creates an important report based on the detected predictive data.

Figure 14:
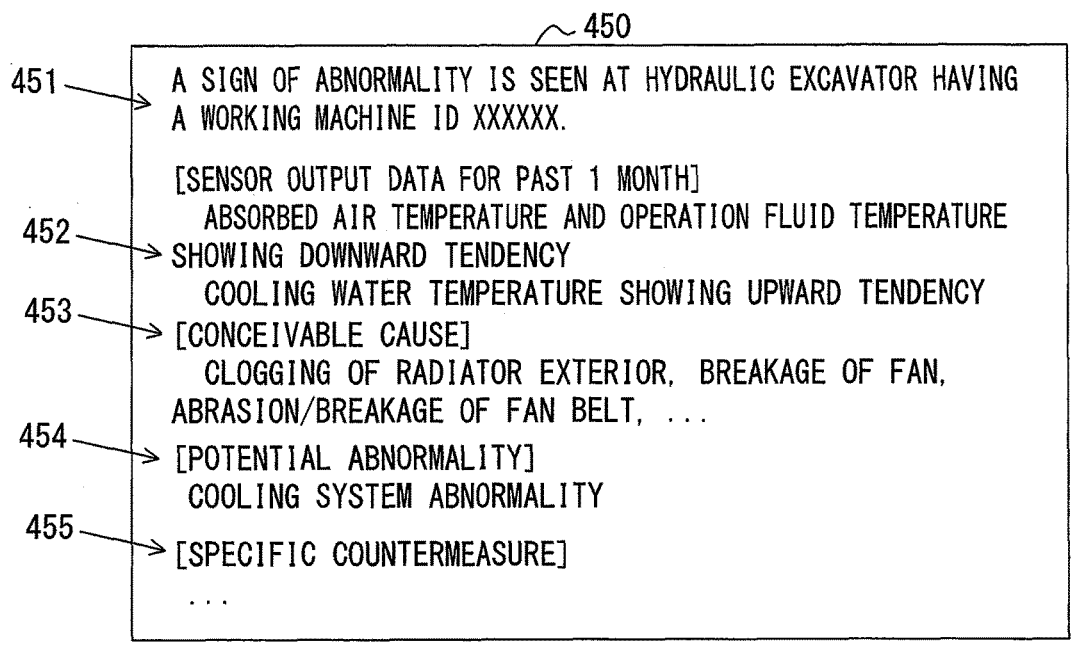
FIG. 14 is a diagram showing an example of the format of an important report.

FIG. 14 is a diagram showing an example of the format of an important report. The important report 450 includes a working machine ID 451 that identifies the hydraulic excavator 100, i.e., an object of the report (the hydraulic excavator 100 of which a sign of abnormality is seen), sensor output data 452 for the past one month representing contents of the sensor output data detected at the hydraulic excavator 100, a possible factor 453 that would present a factor of causing abnormality, potential abnormality 454 representing abnormality that may occur in future, and a specific countermeasure 455 representing a countermeasure for preventing the occurrence of the abnormality.

The control device 510 at the server 500 creates the important report 450 in a language defined in the second language 780 in the contract information database 700 and delivers the created report to a target of delivery (seller) based on the second delivery target address 770. That is, the control device 510 at the server 500 delivers no important report 450 to the purchaser of the hydraulic excavator 100. The reason is that the predictive data is used for determining what maintenance should be made to the hydraulic excavator 100 in future but it does not indicate that the hydraulic excavator 100 becomes inoperable immediately or that the hydraulic excavator 100 will be inoperable inevitably. In other words, the predictive data is relatively uncertain as compared with the abnormality data. If the important report 450 is delivered, this does not mean that any countermeasure must be taken to the hydraulic excavator 100. The seller may examine the delivered important report 450 in detail to check whether any abnormality is actually occurring at the hydraulic excavator 100 and to estimate whether any countermeasure needs to be taken. Delivery of such an uncertain report to the purchaser will make him uneasy and consequently the control device 510 at the server 500 is configured not to deliver the important report 450 to the purchaser.

Figure 15:
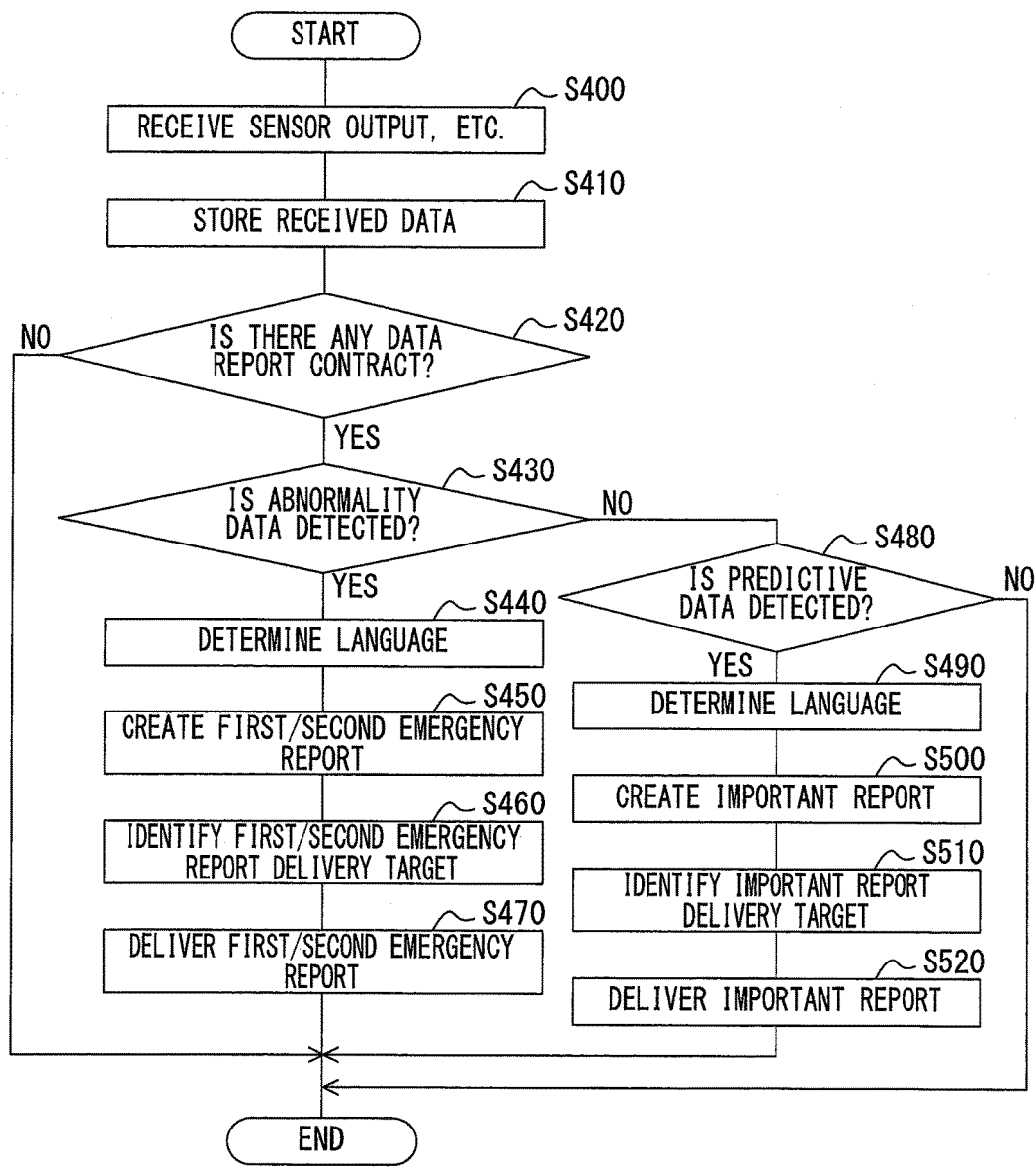
FIG. 15 is a flowchart of data reception processing executed by the control device.
Figure 16:
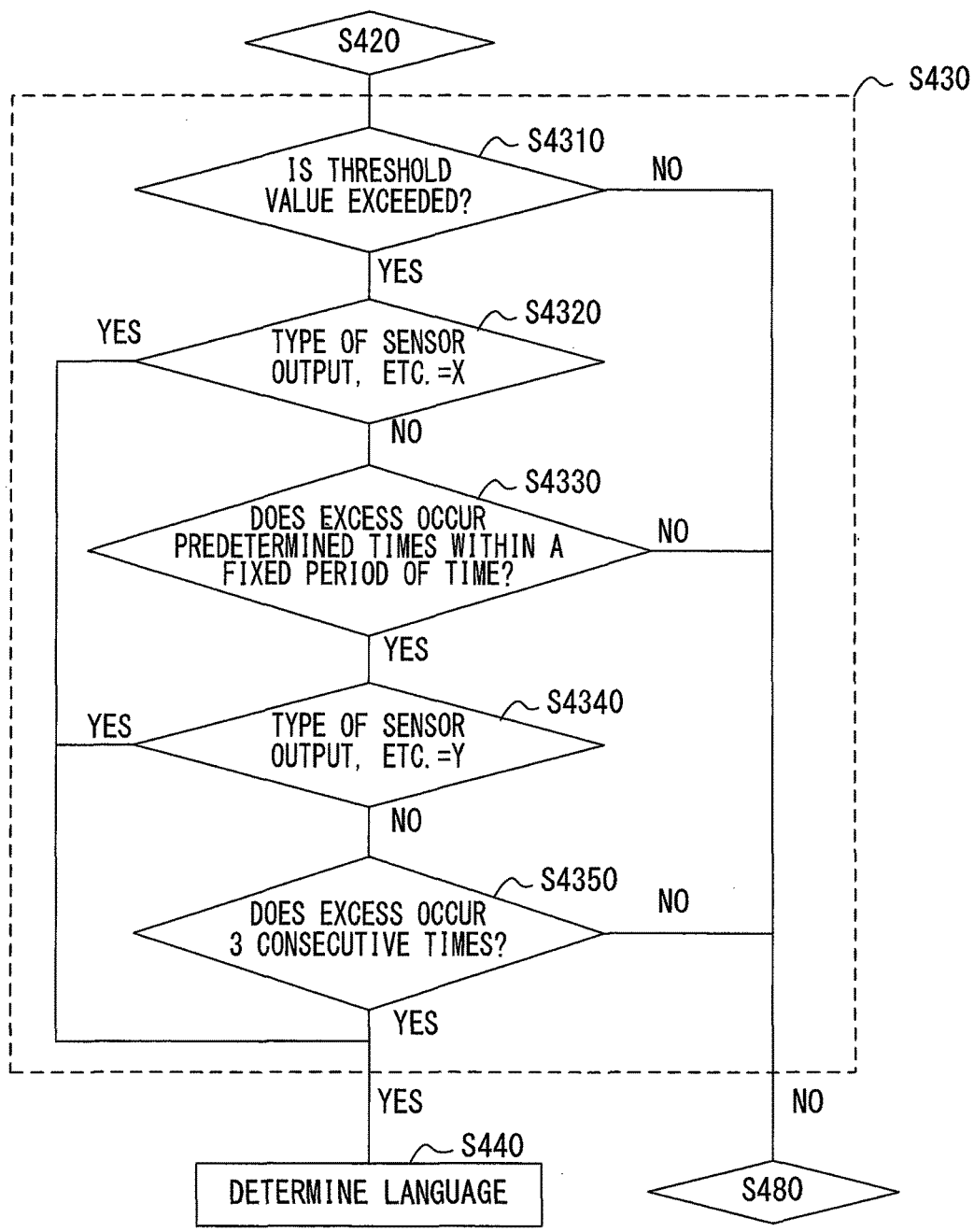

FIG. 15 is a flowchart of data reception processing executed by the control device 510 at the control server 500. This processing is executed each time when any data is transmitted from the hydraulic excavator 100 to the server 500. In step S400, the control device 510 receives data such as sensor outputs from the hydraulic excavator 100 via the communication unit 530. In step S410, the control device 510 stores the received data at the sensor information database 600.

In step S420, the control device 510 searches at the contract information database 700 the working machine ID of the hydraulic excavator 100 which transmitted the data received in step S400 and determines whether any unexpired comprehensive contract or data report contract exists. If no such contract exists, the control device 510 terminates the processing in FIG. 15. If such an unexpired contract exists, the control device 510 causes the control to proceed to step S430.

In step S430, the control device 510 tries to detect abnormality data based on the sensor output data and the like stored in the sensor information database 600 and judges whether abnormality data is detected. If abnormality data is detected, the control device 510 causes the control to proceed to step S440.

In step S440, the control device 510 refers to the first language 760 and the second language 780 and determines the languages of the first emergency report 250 and of the second emergency report 350 to be created this time. In step S450, the control device 510 refers to the sensor information database 600 and creates the first emergency report 250 and the second emergency report 350 based on the sensor output data, etc. stored in the sensor information database 600 in step S430. In step S460, the control device 510 refers to the first delivery target address 750 and the second delivery target address 780 in the contract information database 700 and identifies the delivery targets of the first emergency report 250 and of the second emergency report 350 created this time. In step S470, the control device 510 delivers the first emergency report 250 and the second emergency report 350 created in step S450 to the delivery targets identified in step S460 via the communication unit 530.

If no abnormality data is detected in step S430, the control device 510 causes the control to proceed to step S480. In step S480, the control device 510 tries to detect predictive data based on the sensor output data, etc. stored in the sensor information database 600 and judges whether the predictive data is detected. If the predictive data is detected, the control device 510 causes the control to proceed to step S490.

In step S490, the control device 510 refers to the second language 780 in the contract information database 700 and determines the language of the important report 450 to be created this time. In step S500, the control device 510 refers to the sensor information database 600 and creates the important report 450 based on the sensor output data, etc. stored in the sensor information database 600 in step S430. In step S510, the control device 510 refers to the second delivery target address 780 in the contract information database 700 and identifies the delivery target of the important report 450 created this time. In step S520, the control device 510 delivers the important report 450 created in step S500 to the delivery targets identified in step S510 via the communication unit 530. The server 500 according to the above-mentioned embodiment provides the following operations and advantageous effects.

The server 500 according to the above-mentioned embodiment provides the following operations and advantageous effects.

(1) The control device 510 creates a regular report 150 based on the sensor outputs collected from the hydraulic excavator 100 for each predetermined period of time. If abnormality data is detected based on the sensor outputs, the control device 510 creates the emergency reports 250 and 350 and if predictive data leading to abnormality data is detected based on the sensor outputs, the control device 510 creates the important report 450. The control device 510 delivers each of the regular report 150, the emergency reports 250 and 350, and the important report 450 to the designated delivery targets at deliver timing corresponding to the reports. This configuration allows automatic delivery of reports describing information necessary for the management of the working machine and enables one to obtain the necessary information without cumbersome operations.

(2) Upon creation of the regular report 150, the emergency reports 250 and 350, and the important report 450, the control device 510 refers to the contract information database 700 that stores various pieces of information relating to contracts to determine the language of the reports and creates the reports in the determined language. This configuration enables a report delivery service to be provided to each of the customers who are in a plurality of linguistic areas using a single system.

(3) The control device 510 identifies the purchaser and the seller of the hydraulic excavator 100 as the delivery targets of the emergency reports 250 and 350, the seller of the hydraulic excavator 100 as the delivery target of the important report 450, and the purchaser and the seller of the hydraulic excavator 100 as the delivery target of the regular report 150. This configuration avoids delivery of the important report 450, which describes information unnecessary to the purchaser of the hydraulic excavator 100, to the purchaser and thus eliminates any possible confusion of the purchaser. The information described in the important report 450, which is unnecessary to the purchaser, is useful for proposals of maintenance in future of the hydraulic excavator 100 and such useful information is delivered to the seller without fail.

This enables communication and cooperation between the purchaser and the seller to be made intimately based on these pieces of information and also enables maintenance to be executed at appropriate time properly, so that the working machine owned by the purchaser can be maintained in the best state.

(4) The control device 510 sets, as the delivery targets of the emergency reports 250 and 350, the regular report 150, and the important report 450, a registered address of the purchaser, i.e., one of the parties who concluded a comprehensive contract consisting of a plurality of individual contracts, and a registered address of the seller, i.e., the other party of the contract of sales of the hydraulic excavator 100. In this manner, the contract information is coupled with the delivery target of the report and the hydraulic excavator 100 is correlated with the purchaser and the seller reliably, which enables correct delivery of the report. Separately from the contract information database 700, no database is required for the management of the delivery targets of the report.

(5) The server 500 is connected to the sensor information database 600 that stores information relating to the tuning made to the hydraulic excavator 100 from the client terminal 800, which information is received by the control device 510. The control device 510 creates the regular report 150 containing the information relating to tuning if the sensor information database 600 stores the information relating to the tuning upon creating the regular report 150. This configuration allows the history of executing tuning to be indicated in the regular report 150 to enable the purchaser, particularly manager of the hydraulic excavator 100 (working machine) to grasp the state of tuning accurately. The content of the tuning is not displayed at the hydraulic excavator 100 itself, and although before and after the tuning the hydraulic excavator 100 is unchanged, the operability and amount of operation may differ before and after the tuning, so that the operator may sometimes have a feeling of strangeness. However, if the operator checks the regular report 150, which contains description of the content of the tuning, he will no longer have a feeling of strangeness. Furthermore, the operator can grasp at a glance the relationship between the mode setting value modified by the tuning and the fuel efficiency. This enables one to study a change of set values for further tuning based on how much the fuel efficiency is increased or decreased as a result of the change of mode, which enables the mode setting to better match the content of the work.

(6) Upon detecting abnormality data based on sensor outputs, the control device 510 causes a determination mode for detection of abnormality data to switch to one of the following modes: a mode in which abnormality data is detected if one sensor output exceeds a predetermined threshold value; a mode in which abnormality data is detected if a plurality of chronologically consecutive sensor outputs exceed a predetermined threshold value; or a mode in which abnormality data is detected if a specified number of sensor outputs out of a plurality of sensor outputs that are output within a fixed period of time exceed a predetermined threshold value. This configuration eliminates erroneous detection of abnormality data.

(7) The control device 510 creates the first emergency report 250 delivered to the purchaser, the second emergency report 350 delivered to the seller, which has a larger amount of information than the amount of information of the first emergency report 250. This configuration enables the control device 510 to deliver reports that are easy to understand to the purchaser yet describe information necessary to the seller in exhaustive detail.

(8) The control device 510 at the server 500 collects sensor outputs from the hydraulic excavator 100 for each predetermined period of time and creates and delivers the regular report 150 of the format indicating information corresponding to the sensor output of each corresponding date in each column or field of date in the fuel efficiency calendar 155. This configuration enables the operator to accurately grasp the transition of daily sensor outputs (for instance, fuel efficiency).

(9) The fuel efficiency calendar 155 described in the regular report 150 includes a first region in which numerical value of date is indicated and a third region that is arranged close to the first region, in which the fuel efficiency on the corresponding date is indicated, with the first and third regions being arranged in the form of a matrix. This configuration enables the operator to easily grasp transition of daily fuel efficiency.

(10) The fuel efficiency calendar 155 described in the regular report 150 includes a first region in which a numerical value of date is indicated and a third region arranged closed to the first region, in which fuel efficiency on corresponding date is indicated, these pieces of the information being arranged for each calendar month. This configuration enables the operator to easily grasp deviation of fuel efficiency in a certain month.

The following variation examples are also within the scope of the present invention. One or more variation examples can be combined with the above-mentioned embodiment.

FIRST VARIATION EXAMPLE

The first embodiment in which the present invention is adopted in the server 500 used in the management system 1 of the hydraulic excavator 100 is explained above. However, the present invention may be adopted in servers used in management systems for working machines other than the hydraulic excavator, for instance, a wheel loader, mining machinery, a crawler crane, a dump truck, and the like.

SECOND VARIATION EXAMPLE

In the above-mentioned embodiment, the server 500 transmits three types of reports to the address of the purchaser or the seller of the hydraulic excavator 100 for which a comprehensive contract or a data report contract is concluded. However, the reports may be transmitted to other addresses. For instance, the control device 510 may deliver all of the emergency report, the important report, and the regular report to the address of a person who concluded the comprehensive contract. The control device 510 may deliver one or two of the emergency report, the important report, and the regular report to the address of a person who concluded at least one of the long-term guarantee contract, the maintenance contract, the data report contract, and the tuning contract. That is, the type of report to be delivered may be different depending on whether the contract is a comprehensive contract or other contracts than the comprehensive contract.

THIRD VARIATION EXAMPLE

The content and format of each of the reports may be different from the contents and formats as shown in FIG. 11, FIG. 13, and FIG. 14 in the above-mentioned embodiment. The control device 510 at the server 500, as shown in an example of format of the regular report illustrated in, for instance, FIG. 17, may be configured to additionally describe in the regular report 150 exemplified in FIG. 11 a display region 1610 including average values of fuel efficiency, operation fluid temperature, water temperature, and pump pressure based on the sensor outputs from a plurality of other hydraulic excavators 100 of the same model as the model of the hydraulic excavator 10 that is the object of the report. This configuration enables relative comparison of the operation state of a certain hydraulic excavator 100 with the operation states of the other machines of the same model. Providing each of a plurality of hydraulic excavators 100 with a GPS sensor enables the control device 510 to calculate average values of fuel efficiency, operation fluid temperature, water temperature, and pump pressure based on sensor outputs from a plurality of hydraulic excavators 100, each of which not only is of the same model as that of the hydraulic excavator 100 that is the object of the report but also operates in the same area as the area in which the hydraulic excavator 100 that is the object of the report operates as determined based on the positional information of the plurality of hydraulic excavators 100 that is output from the individual GPS sensors and additionally describe such average values in the regular report 150. This configuration enables comparison of the operation state between the hydraulic excavator 100, which is the object of report and another hydraulic excavator 100 which is under substantially the same condition of ambient environment such as weather condition. Any demarcation may be set for "same area". The "same area" may be, for instance, "same site", "same municipality", "same country", or "same state". The regular report 150 may be created in different frequency than the frequency used in the above-described embodiment. Each report may be delivered at different timing than the timing adopted in the above-mentioned embodiment.

FOURTH VARIATION EXAMPLE

In the above-mentioned embodiment, the control device 510 at the server 500 receives the tuning information from the client terminal 800. However, the tuning information may be received from the hydraulic excavator 100.

FIFTH VARIATION EXAMPLE

In the above-mentioned embodiment, the fuel efficiency calendar 155 is indicated only in the regular report 150. However, it may be indicated in the emergency reports 250 and 350 or in the important report 450. In the fuel efficiency calendar 155, instead of indicating operation time and fuel consumption, other items, for instance, operation time and number of times of the DPF regeneration, the average load, and the maximum load, various pieces of information and combinations of these may be indicated.

As far as the features of the present invention are not damaged, the present invention is not limited to the embodiments described above and other embodiments conceivable within the technical concept of the present invention are included in the scope of the present invention. The embodiments and variation examples explained above may be combined with each other as appropriate.

The disclosure of the following priority application is herein incorporated by reference:

Japanese Patent Application No. 2013-46916 (filed on Mar. 8, 2013);

REFERENCE SIGNS LIST 1 management system
20 controller
100 hydraulic excavator 200 communication satellite
300 base station
400 network
500 server
510 control device
600 sensor information database
700 contract information database
800 client terminal
810 control device
900 information terminal

The invention claimed is:

1. A management server for a working machine, comprising:
a processor; and
a memory connected to the processor and storing instructions that, when executed by the processor, cause the processor to:
receive a sensor output from the working machine;
create, for each predetermined period of time, a regular report indicating an operation state of the working machine within the predetermined period of time based on the sensor output;
create at least one emergency report upon detecting abnormality data representing abnormality of the working machine based on the sensor output;
create an important report upon detecting data indicating a possibility that is likely to lead to an actual abnormality of the working machine in the future although it is unnecessary to take any immediate action to cope with the actual abnormality of the working machine in the future based on the sensor output;
identify a regular report delivery target, an emergency report delivery target, and an important report delivery target from a first database that stores first information relating to the regular report delivery target, the emergency report delivery target, and the important report delivery target; and
deliver the regular report, the at least one emergency report, and the important report, respectively, to the regular report delivery target, the emergency report delivery target, and the important report delivery target,
wherein the first information is referred to in order to identify a first delivery target that corresponds to a purchaser of the working machine and a second delivery target that corresponds to a seller of the working machine as the emergency report delivery target, to identify the second delivery target that corresponds to the seller as the important report delivery target, and to identify the first delivery target that corresponds to the purchaser and the second delivery target that corresponds to the seller as the regular report delivery target.

2. The management server for a working machine according to claim 1, wherein the memory stores instructions that, when executed by the processor, further cause the processor to:
determine respective languages that are used to create each of the regular report, the at least one emergency report, and the important report by referring to second information stored in the first database,
wherein the regular report, the at least one emergency report, and the important report are created in the determined respective languages.

3. The management server for a working machine according to claim 1,
wherein the data indicating the possibility that is likely to lead to the actual abnormality of the working machine in the future is predictive data that represents a sign of the actual abnormality of the working machine which has a possibility to be an obstacle to operation of the working machine in the future.

4. The management server for a working machine according to claim 1, wherein the memory stores instructions that, when executed by the processor, further cause the processor to:
a second database that stores third information relating to tuning executed to the working machine by an external terminal device; and
receive third information relating to tuning executed on the working machine from an external terminal device; and
store the received third information in a second database,
wherein if the third information is stored in the second database when creating the regular report, the regular report is created including the third information.

5. The management server for a working machine according to claim 1,
wherein the regular report includes an average value of any one of fuel consumption, operation fluid temperature, water temperature, and pump pressure based on sensor outputs from a plurality of other working machines of a same model as the working machine.

6. The management server for a working machine according to claim 1, wherein the memory stores instructions that, when executed by the processor, further cause the processor to:
switch a mode for detection of the abnormality data depending on a type of the sensor output to one selected from a mode in which the abnormality data is detected when the sensor output exceeds a predetermined threshold value once, a mode in which the abnormality data is detected when the sensor output exceeds the predetermined threshold value a plurality of times consecutively, or a mode in which the abnormality data is detected when the sensor output exceeds the predetermined threshold time a specified number of time within a fixed period of time, when detecting the abnormality data based on the sensor output.

7. The management server for a working machine according to claim 1,
wherein the at least one emergency report includes a first emergency report and a second emergency report that contains an amount of information larger than the first information,
wherein the memory stores instructions that, when executed by the processor, further cause the processor to:
identify the first delivery target that corresponds to the purchaser as the emergency report delivery target that corresponds to the first emergency report, and identify the second delivery target that corresponds to the seller as the emergency report delivery target that corresponds to the second emergency report.

8. A method for managing a working machine, comprising:
receiving a sensor output from the working machine;
creating, for each predetermined period of time, a regular report that indicates an operation state of the working machine within the predetermined period of time based on the sensor output;
creating at least one emergency report each time when abnormality data representing abnormality of the working machine is detected based on the sensor output;
creating an important report each time when data indicating a possibility that is likely to lead to an actual abnormality of the working machine in the future although it is unnecessary to take any immediate action to cope with the actual abnormality of the working machine in the future is detected based on the sensor output;

referring to information relating to a regular report delivery target, an emergency report delivery target, and an important report delivery target which are predetermined in advance in order to identify a first delivery target that corresponds to a purchaser of the working machine and a second delivery target that corresponds to a seller of the working machine as the emergency report delivery target, to identify the second delivery target that corresponds to the seller as the important report delivery target, and to identify the first delivery target that corresponds to the purchaser and the second delivery target that corresponds to the seller as the regular report delivery target; and delivering the regular report, the at least one emergency report, and the important report, respectively, to the identified regular report delivery target, the identified emergency report delivery target, and the identified important report delivery target.

9. The method for managing a working machine according to claim 8, further comprising:

switching a mode for detection of the abnormality data depending on a type of the sensor output to one selected from a mode in which the abnormality data is detected when the sensor output exceeds a predetermined threshold value once, a mode in which the abnormality data is detected when the sensor output exceeds the predetermined threshold value a plurality of times consecutively, and a mode in which the abnormality data is detected when the sensor output exceeds the predetermined threshold time a specified number of time within a fixed period of time, when detecting the abnormality data based on the sensor output.

* * * * *